May 8, 1962 T. A. HERBERT, JR 3,033,973
APPARATUS AND METHOD FOR BRAZING HONEYCOMB SANDWICH PANELS
Filed Jan. 11, 1961
21 Sheets-Sheet 1
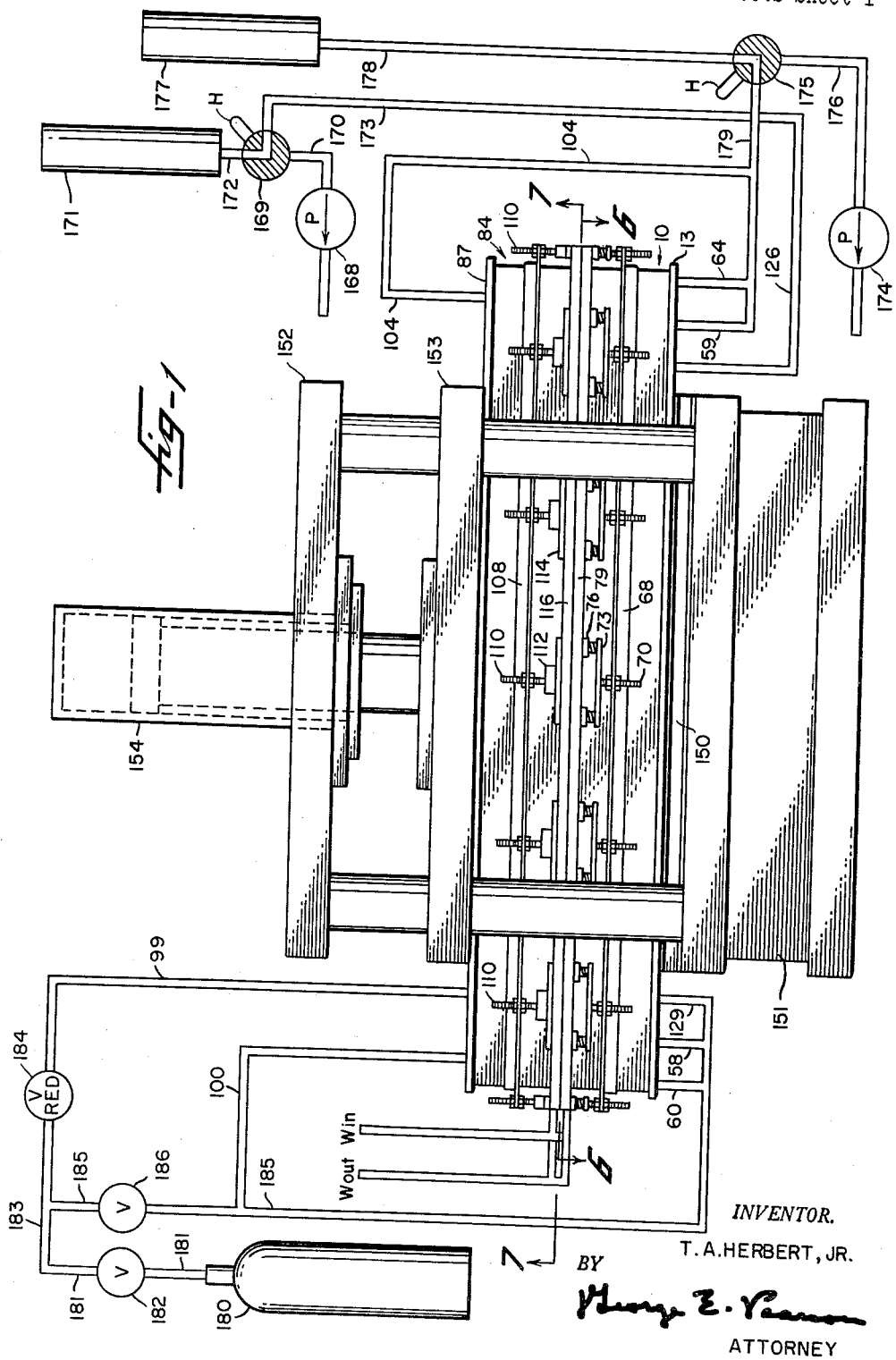
INVENTOR.
T. A. HERBERT, JR.
BY
George E. Pearson
ATTORNEY

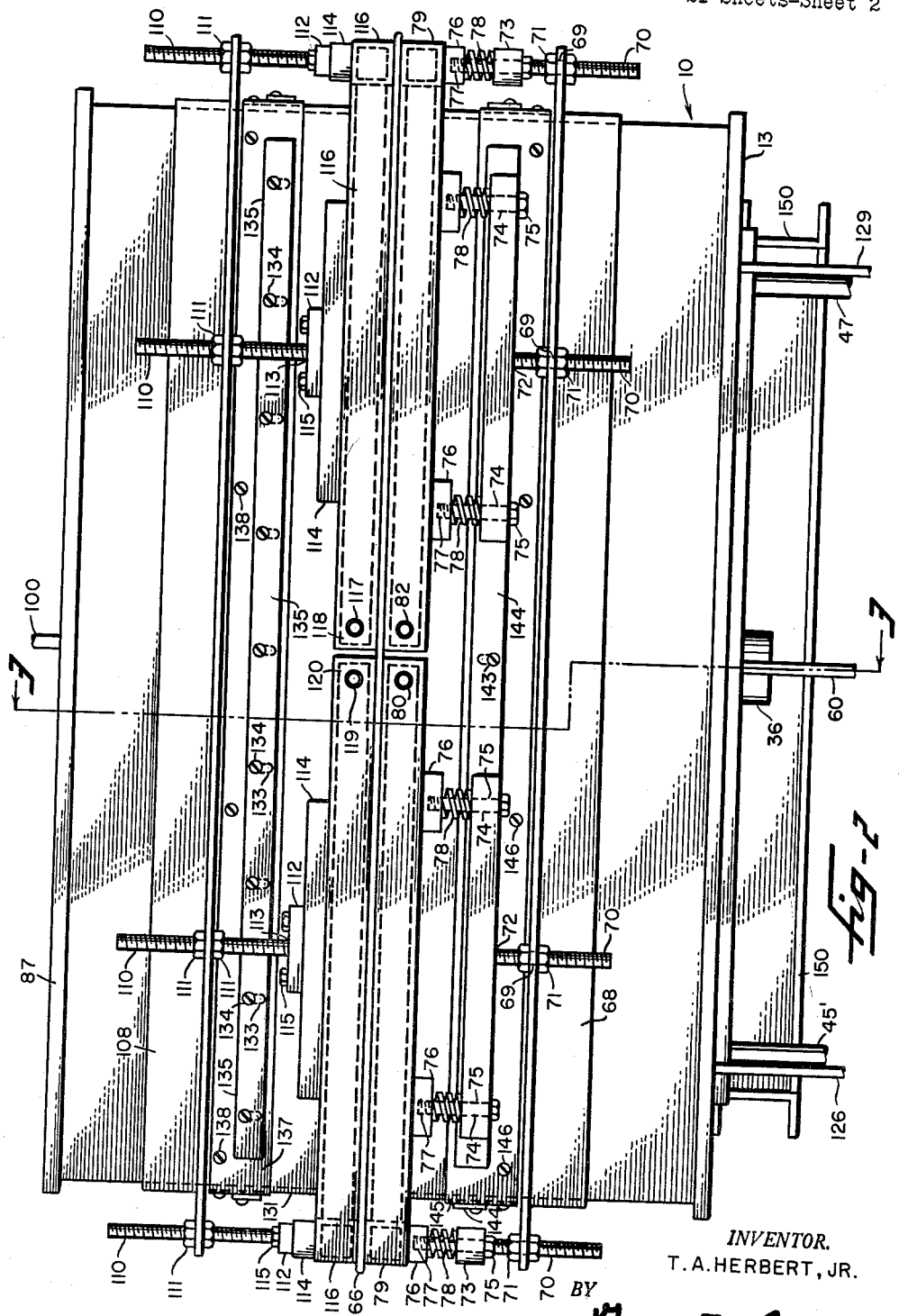

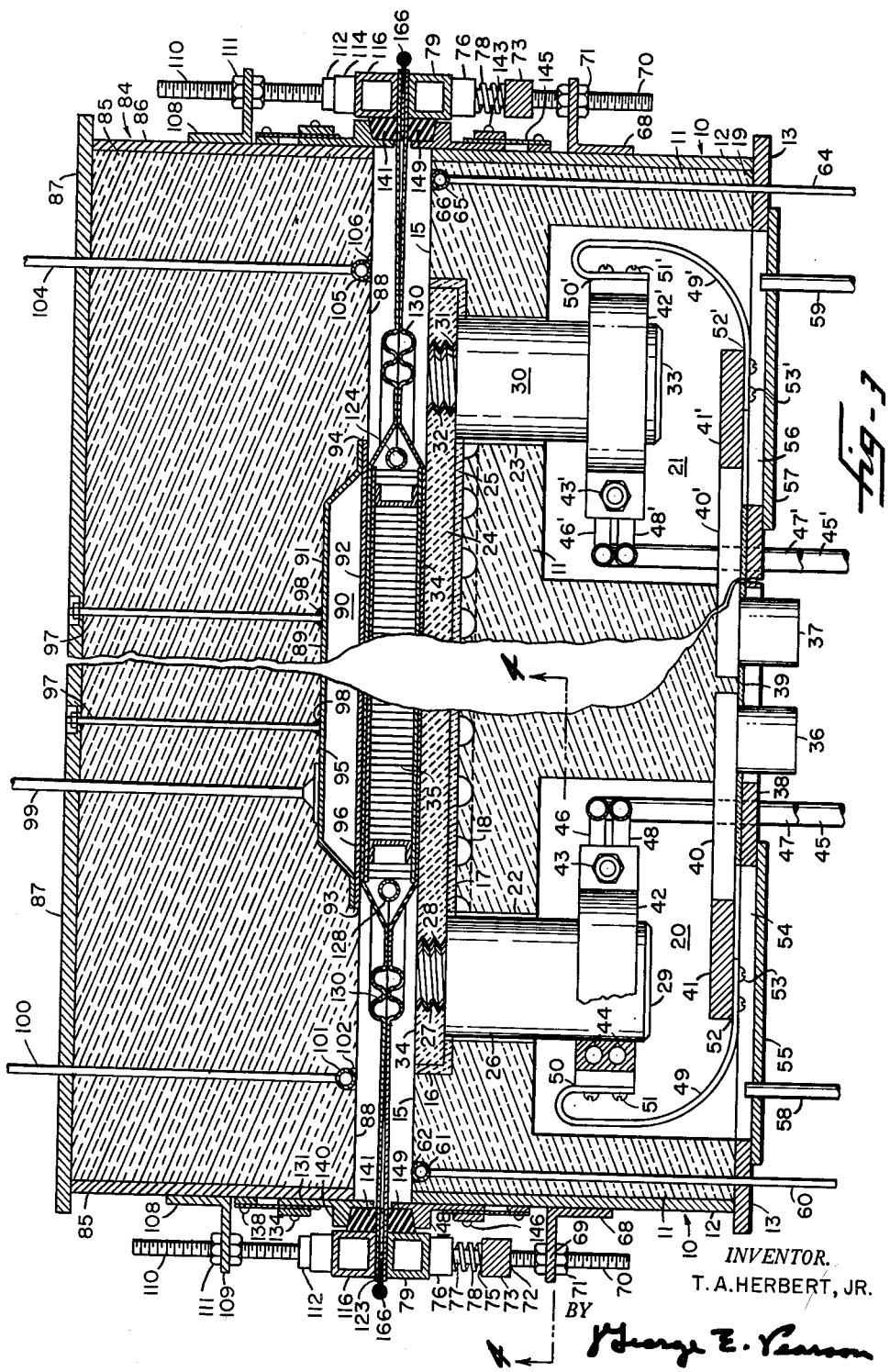

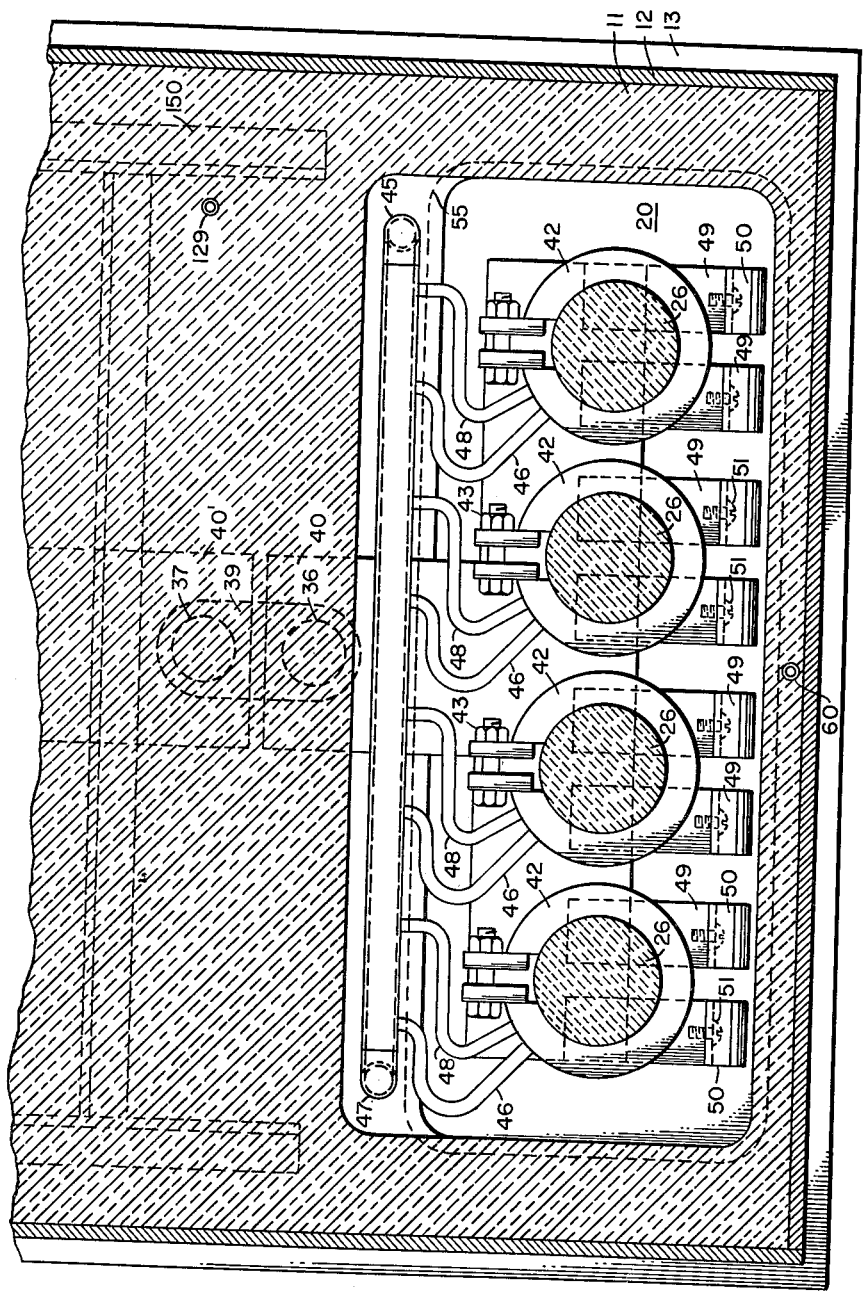

May 8, 1962 T. A. HERBERT, JR 3,033,973
APPARATUS AND METHOD FOR BRAZING HONEYCOMB SANDWICH PANELS
Filed Jan. 11, 1961 21 Sheets-Sheet 5
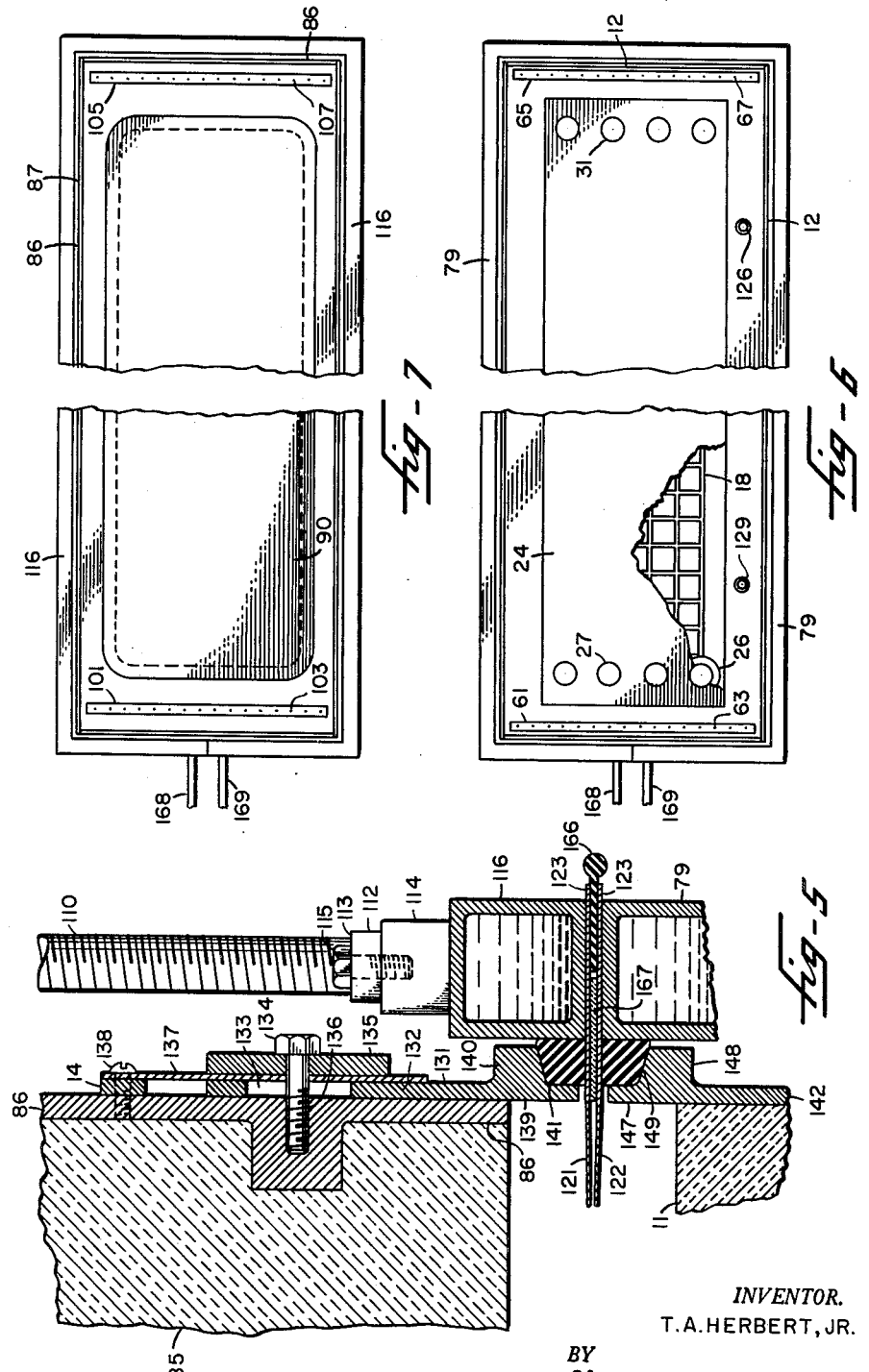
INVENTOR.
T.A.HERBERT, JR.
BY
George E. Pearson
ATTORNEY

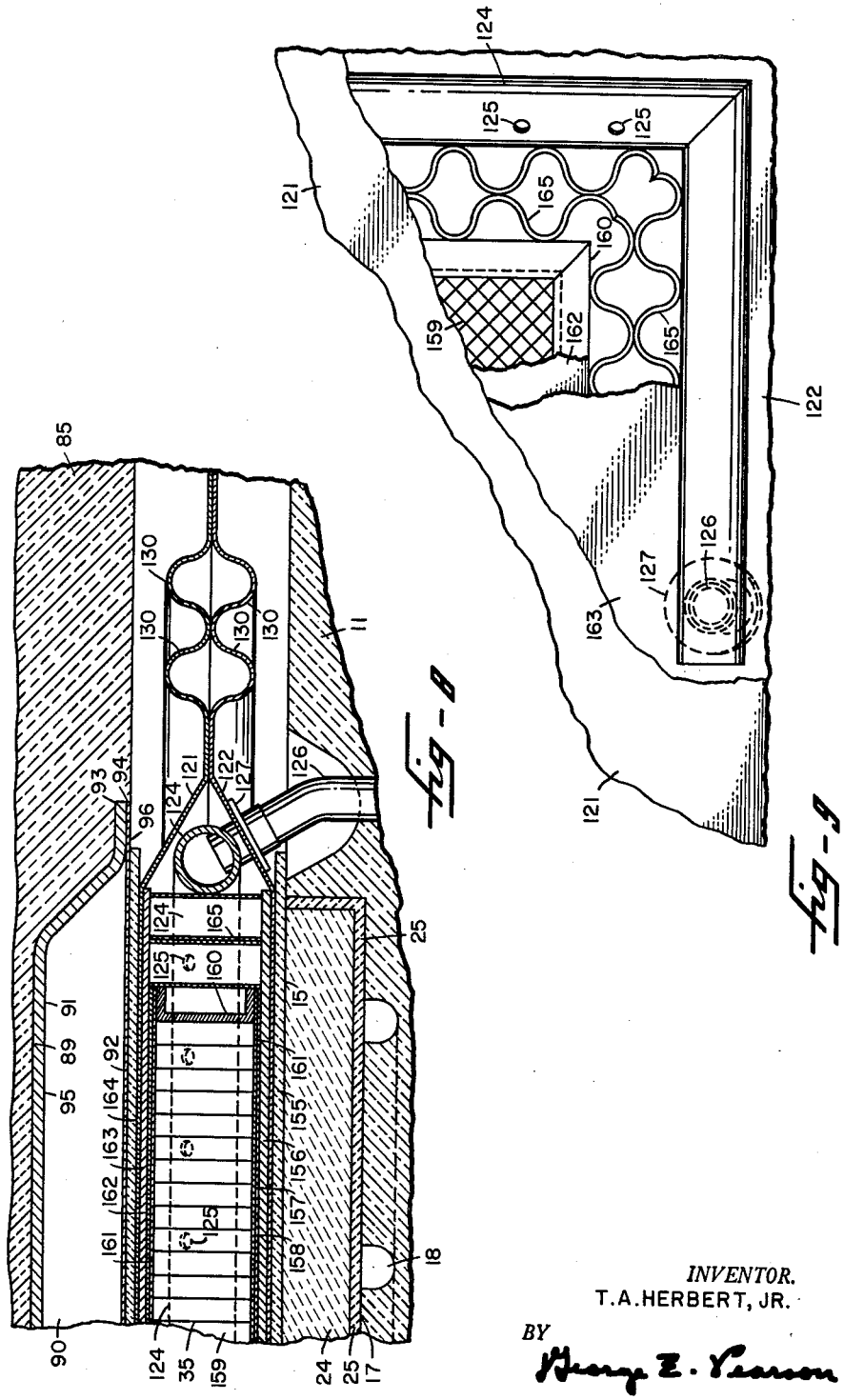

May 8, 1962  T. A. HERBERT, JR  3,033,973
APPARATUS AND METHOD FOR BRAZING HONEYCOMB SANDWICH PANELS
Filed Jan. 11, 1961  21 Sheets-Sheet 7

INVENTOR.
T.A.HERBERT, JR.
BY
George E. Pearson
ATTORNEY

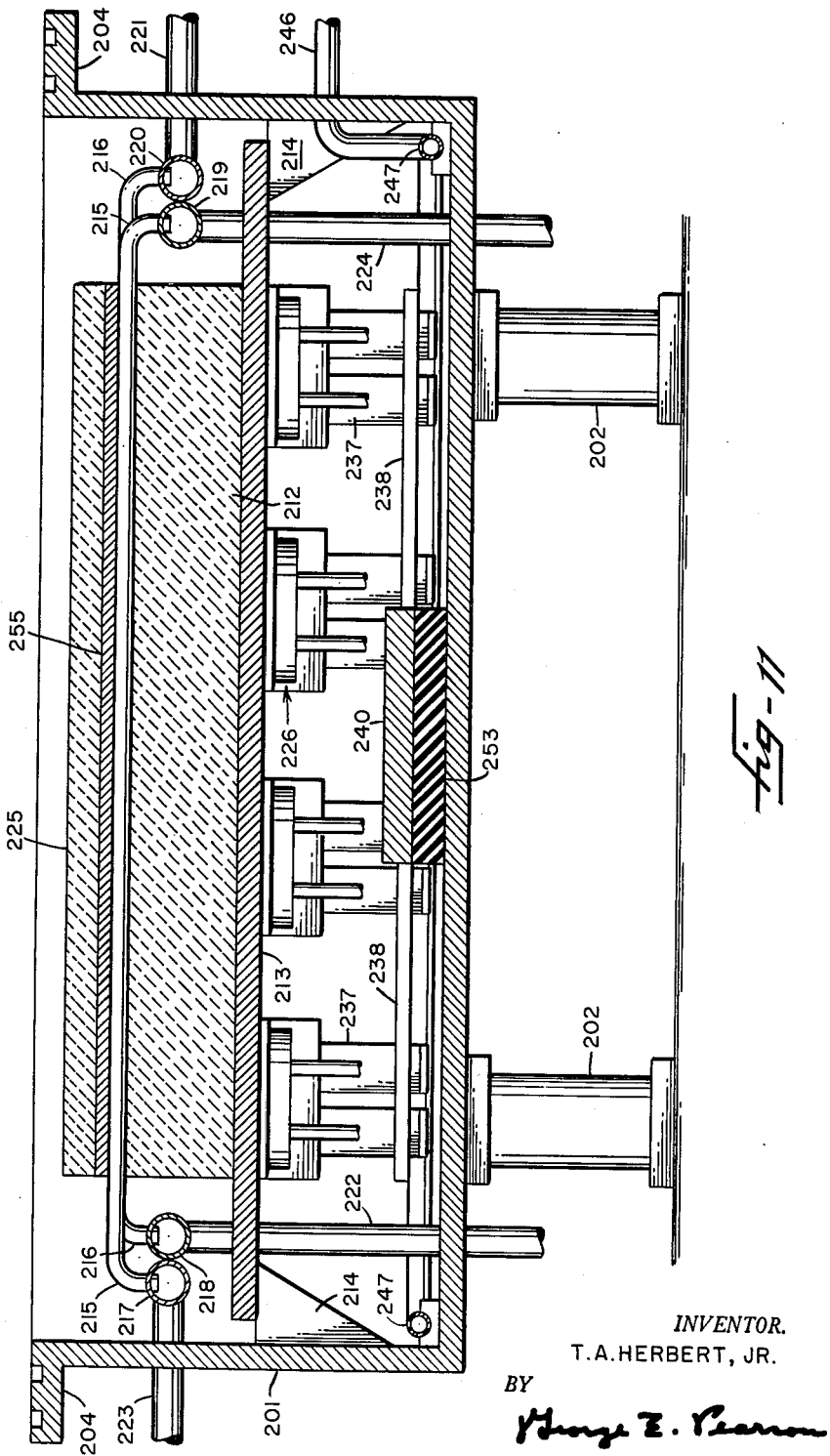

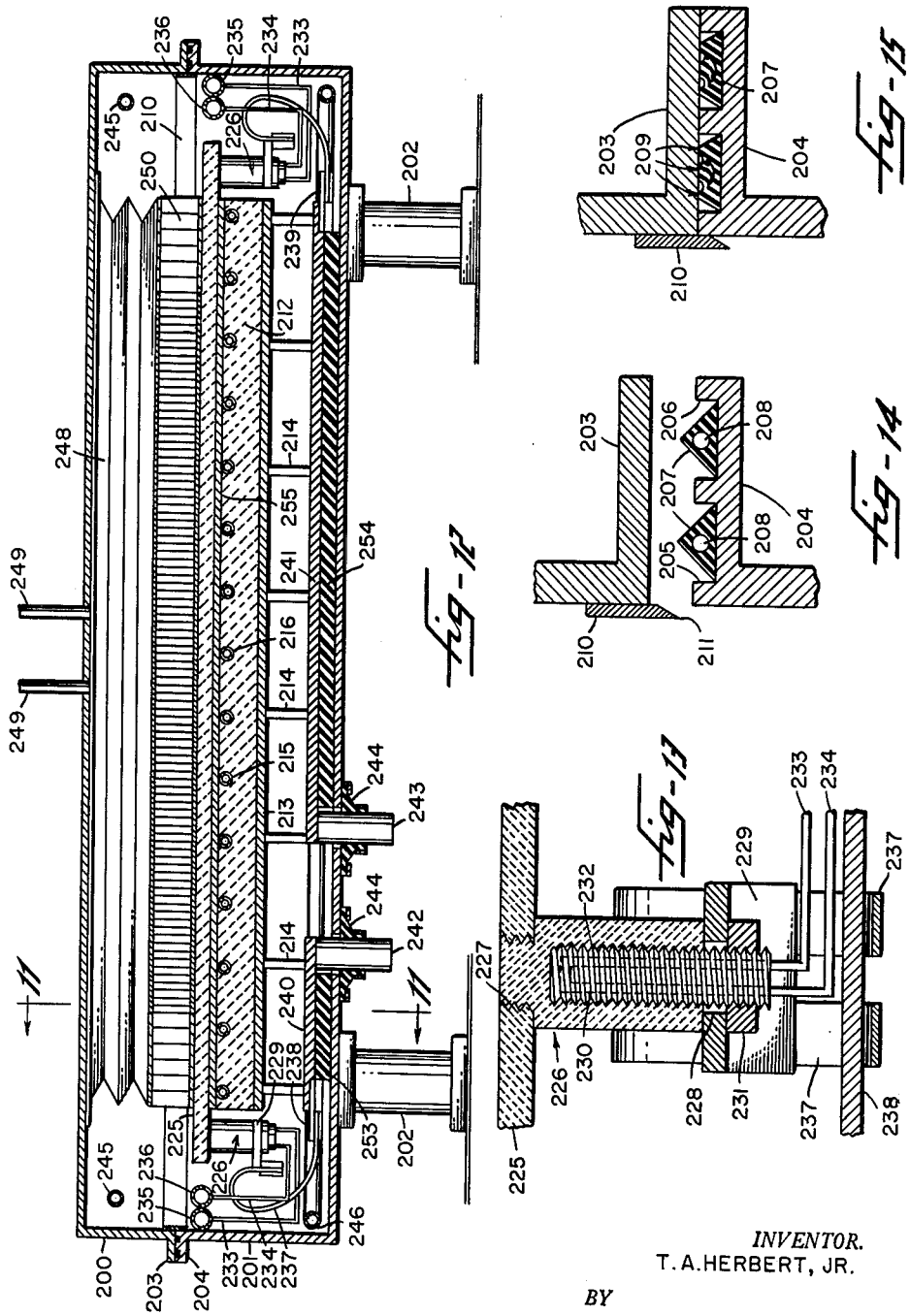

May 8, 1962 T. A. HERBERT, JR 3,033,973
APPARATUS AND METHOD FOR BRAZING HONEYCOMB SANDWICH PANELS
Filed Jan. 11, 1961 21 Sheets-Sheet 10

INVENTOR.
T. A. HERBERT, JR.
BY
George E. Pearson
ATTORNEY

May 8, 1962 T. A. HERBERT, JR 3,033,973
APPARATUS AND METHOD FOR BRAZING HONEYCOMB SANDWICH PANELS
Filed Jan. 11, 1961 21 Sheets-Sheet 11

INVENTOR.
T.A.HERBERT, JR.
BY
ATTORNEY

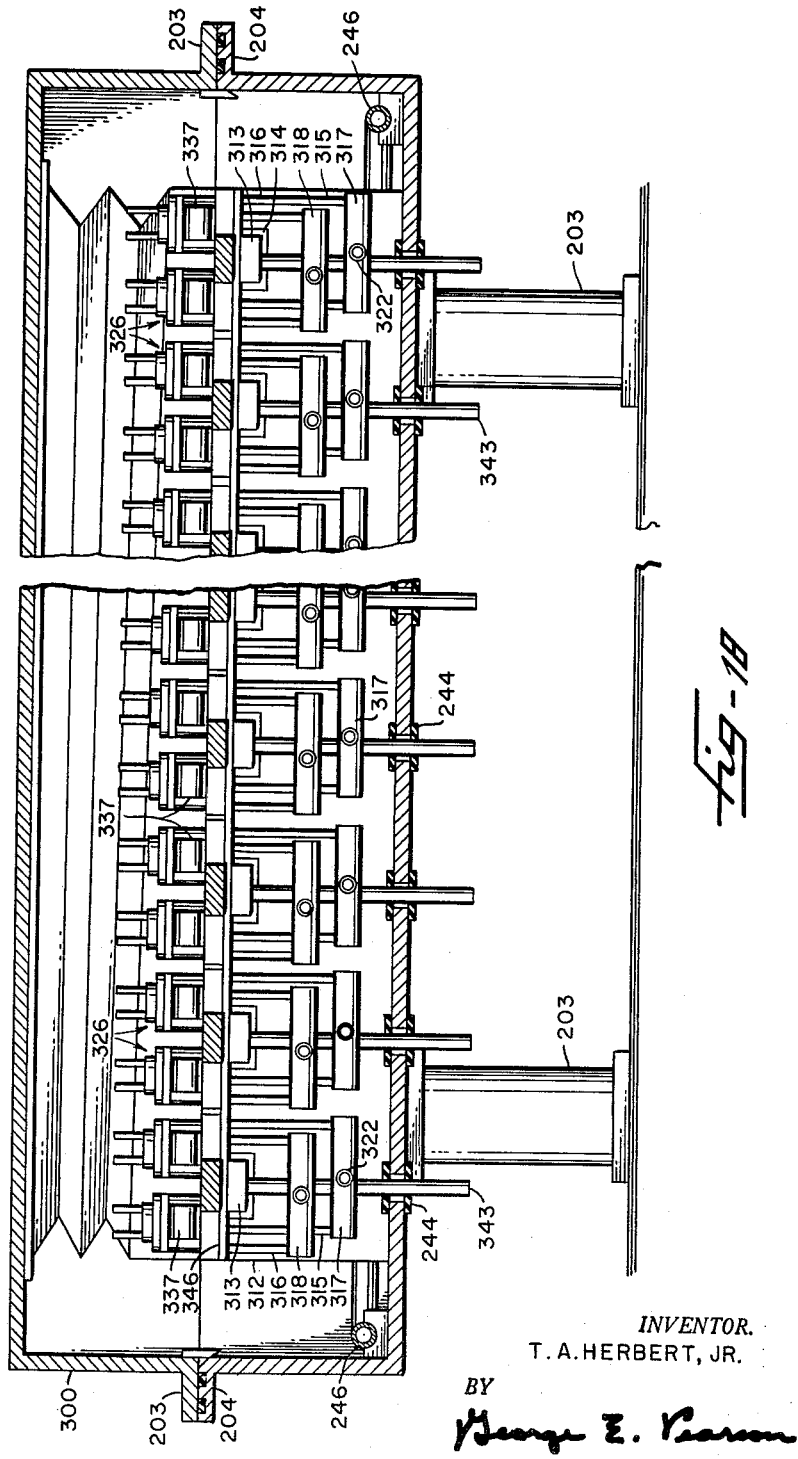

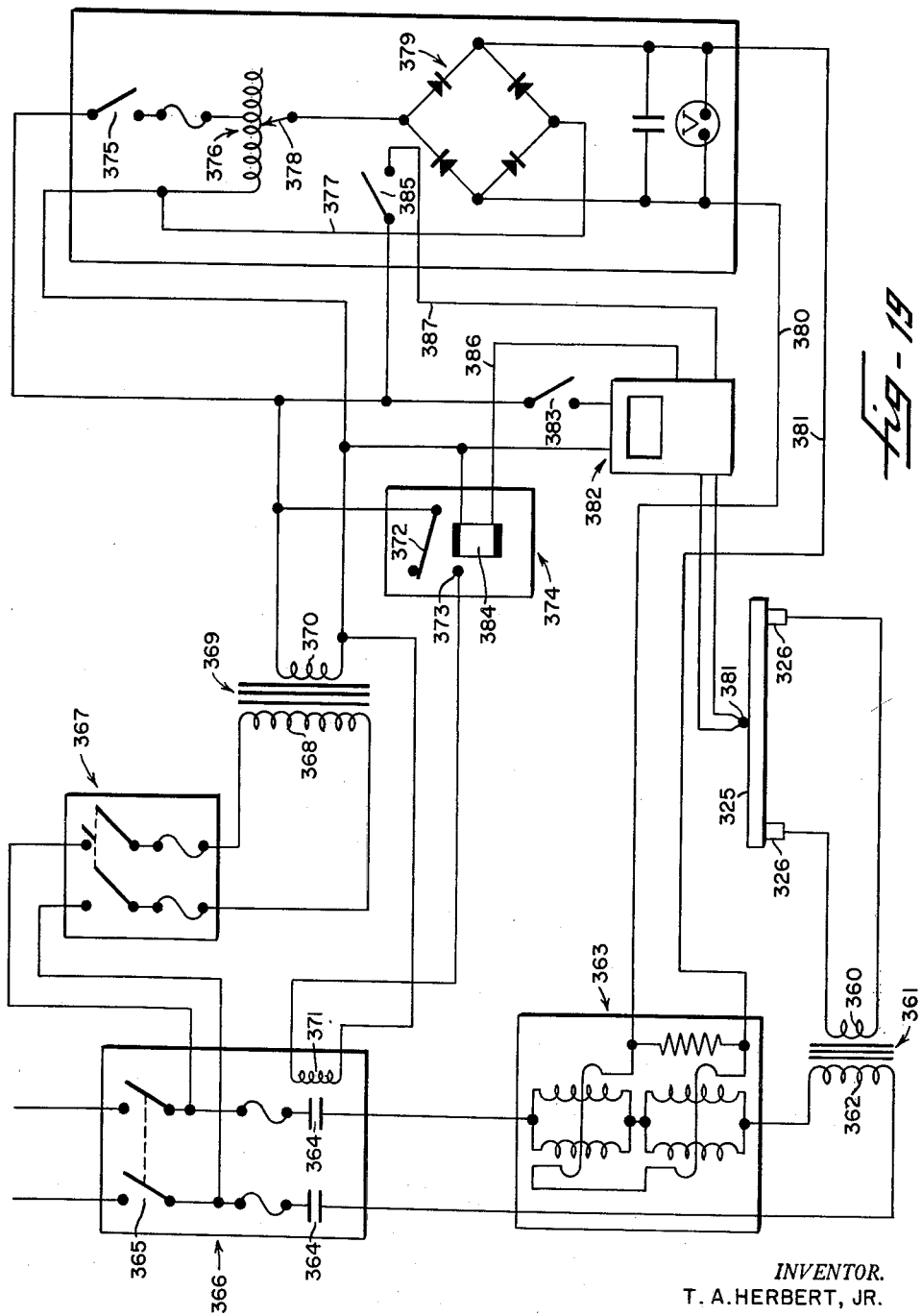

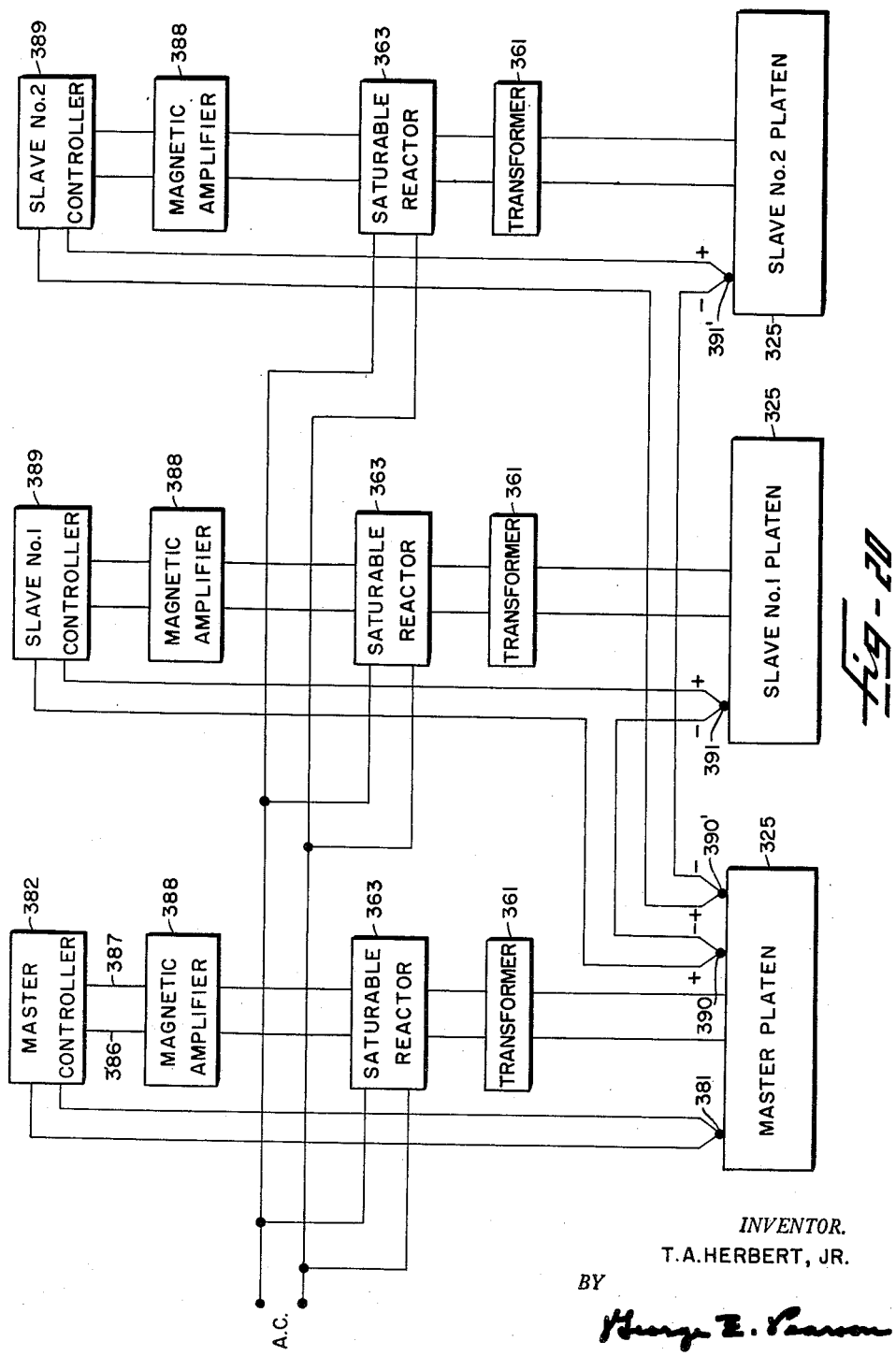

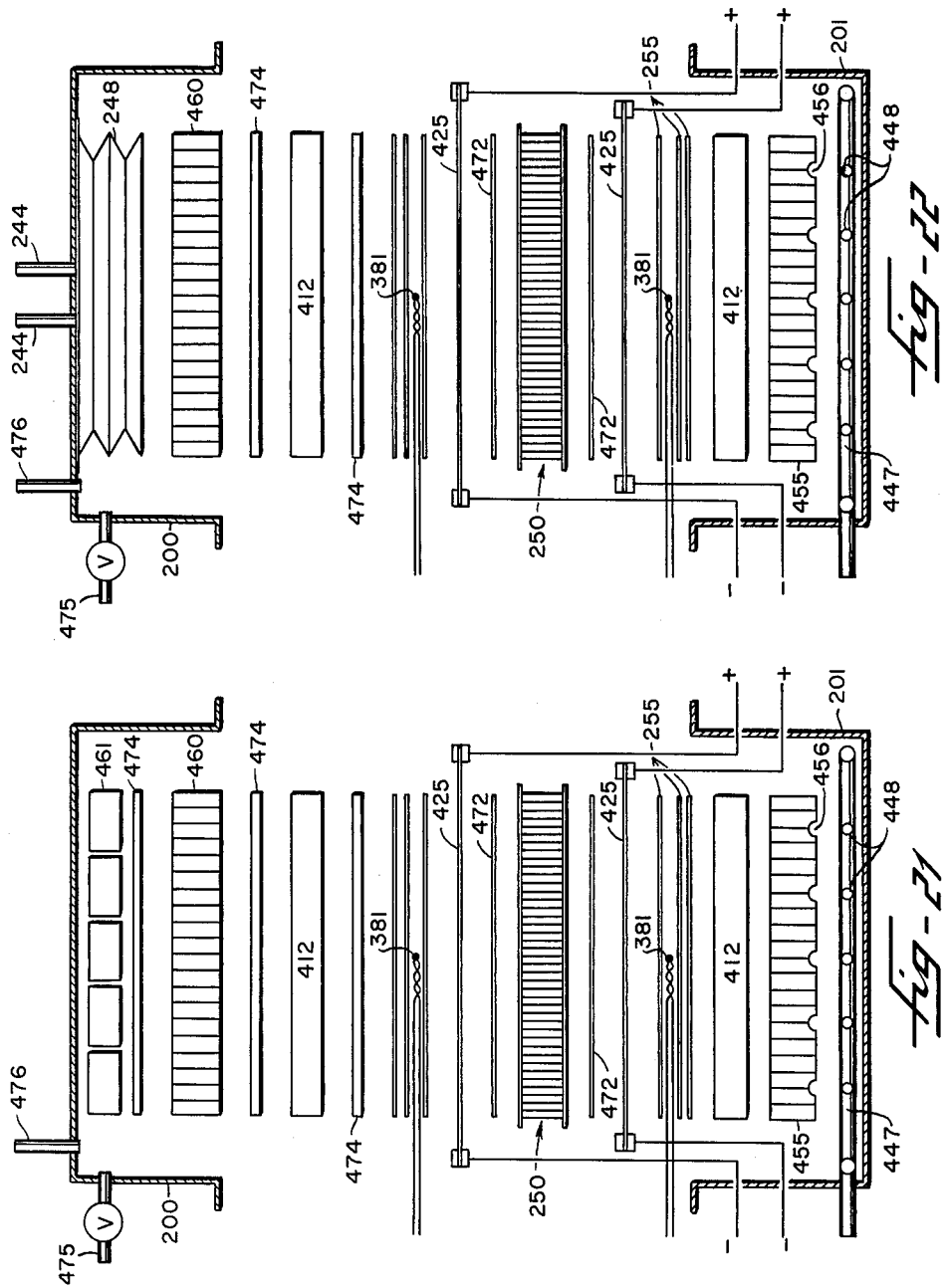

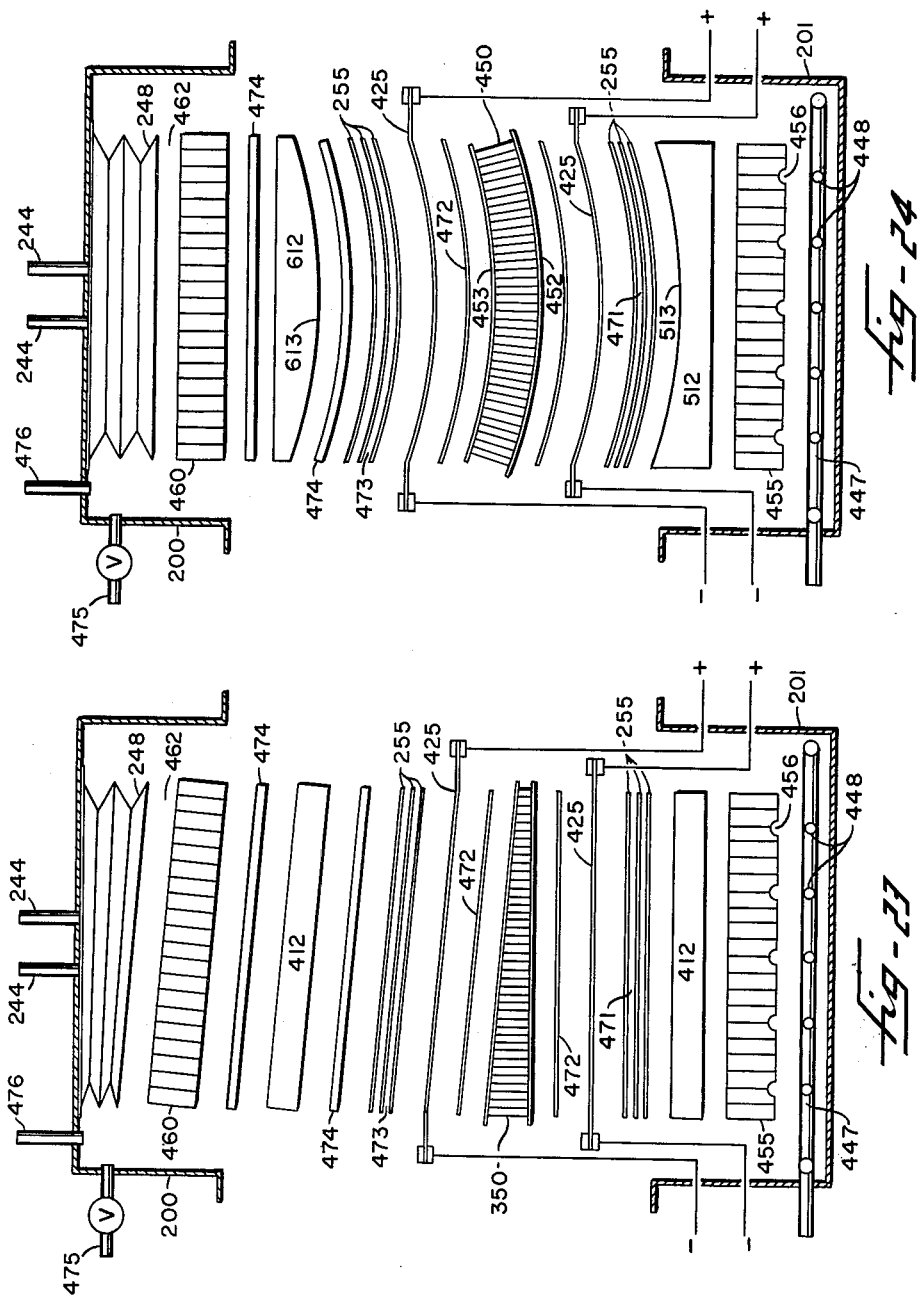

May 8, 1962 T. A. HERBERT, JR 3,033,973
APPARATUS AND METHOD FOR BRAZING HONEYCOMB SANDWICH PANELS
Filed Jan. 11, 1961 21 Sheets-Sheet 17
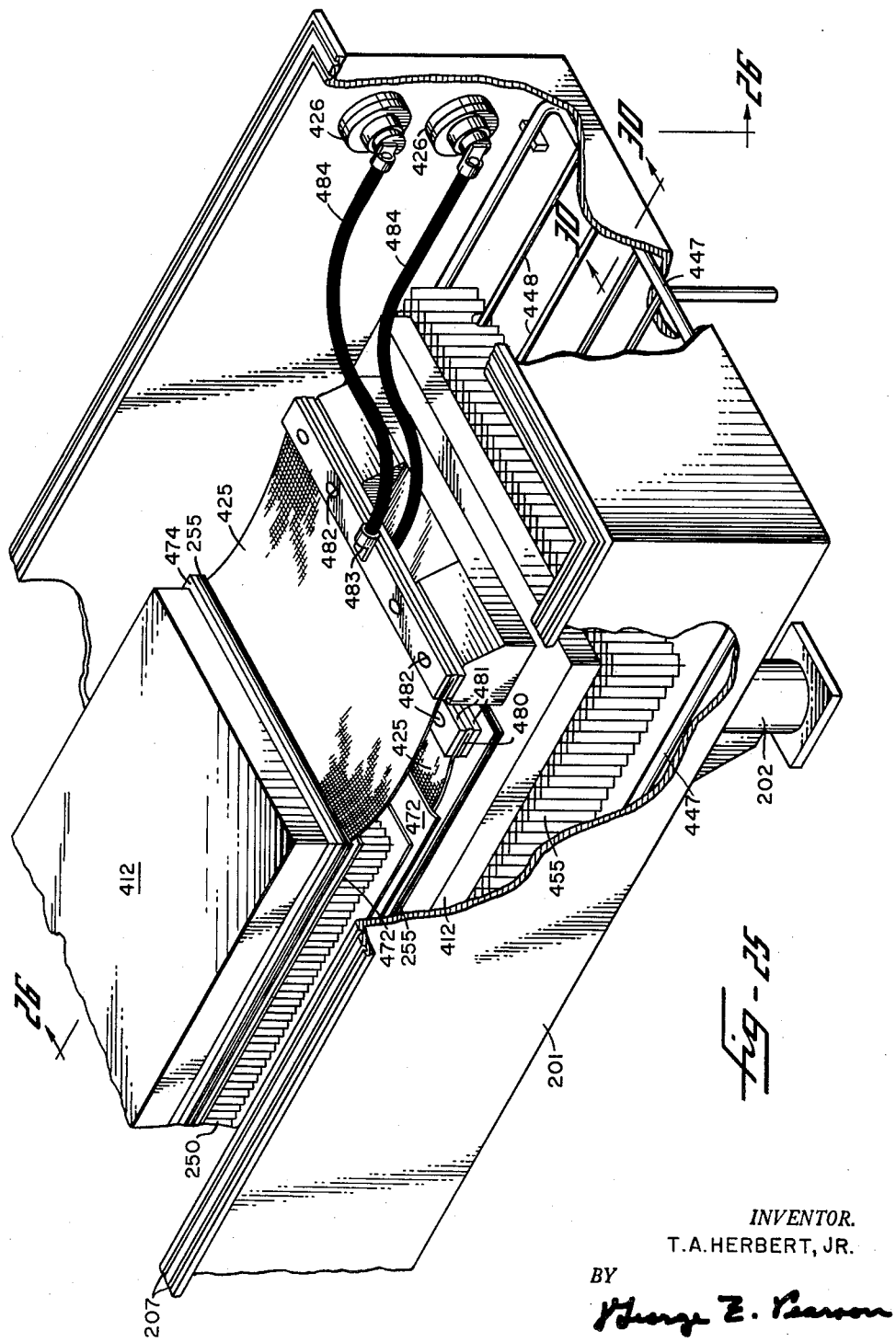
*INVENTOR.*
T.A. HERBERT, JR.
BY
ATTORNEY

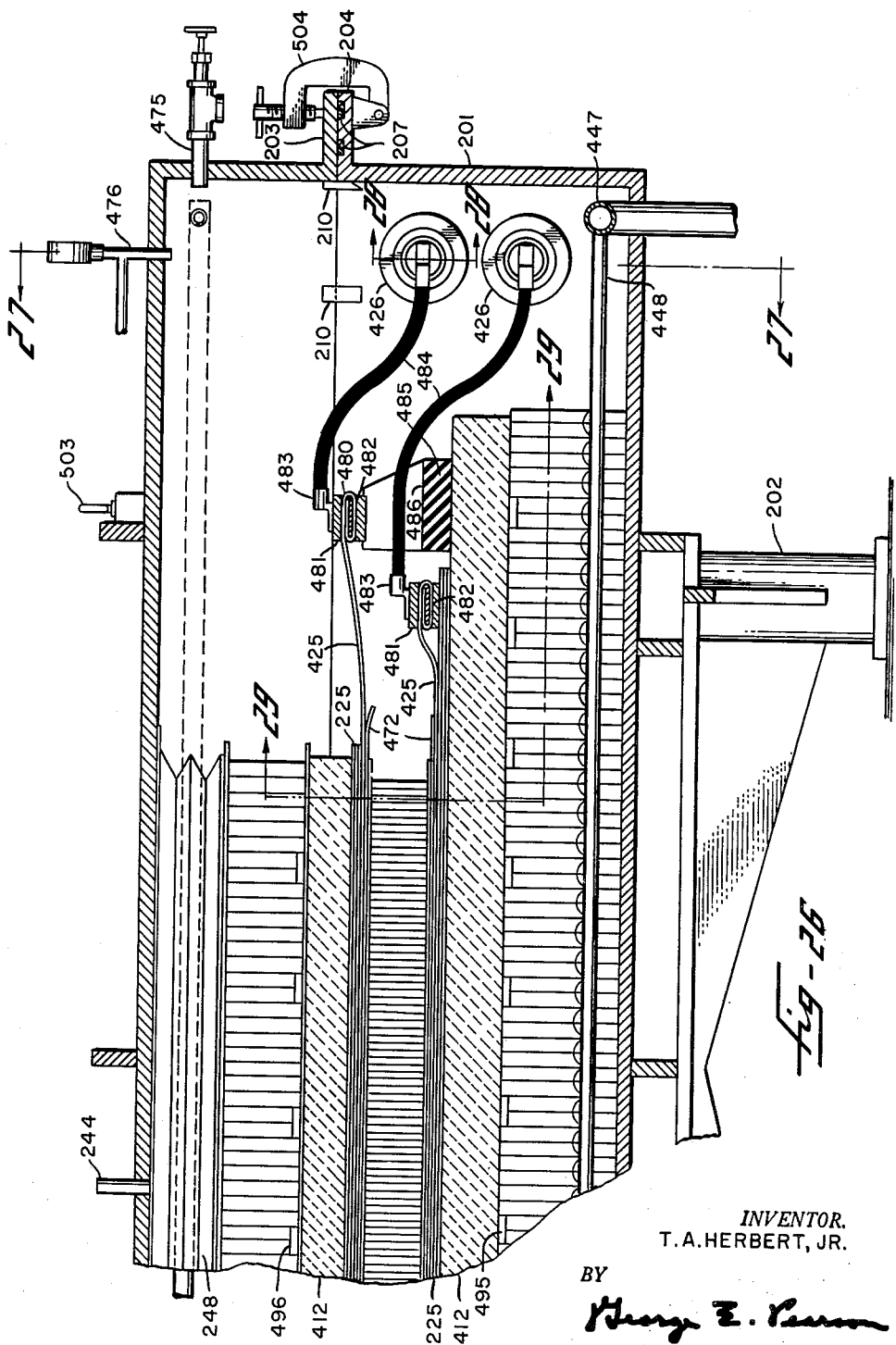

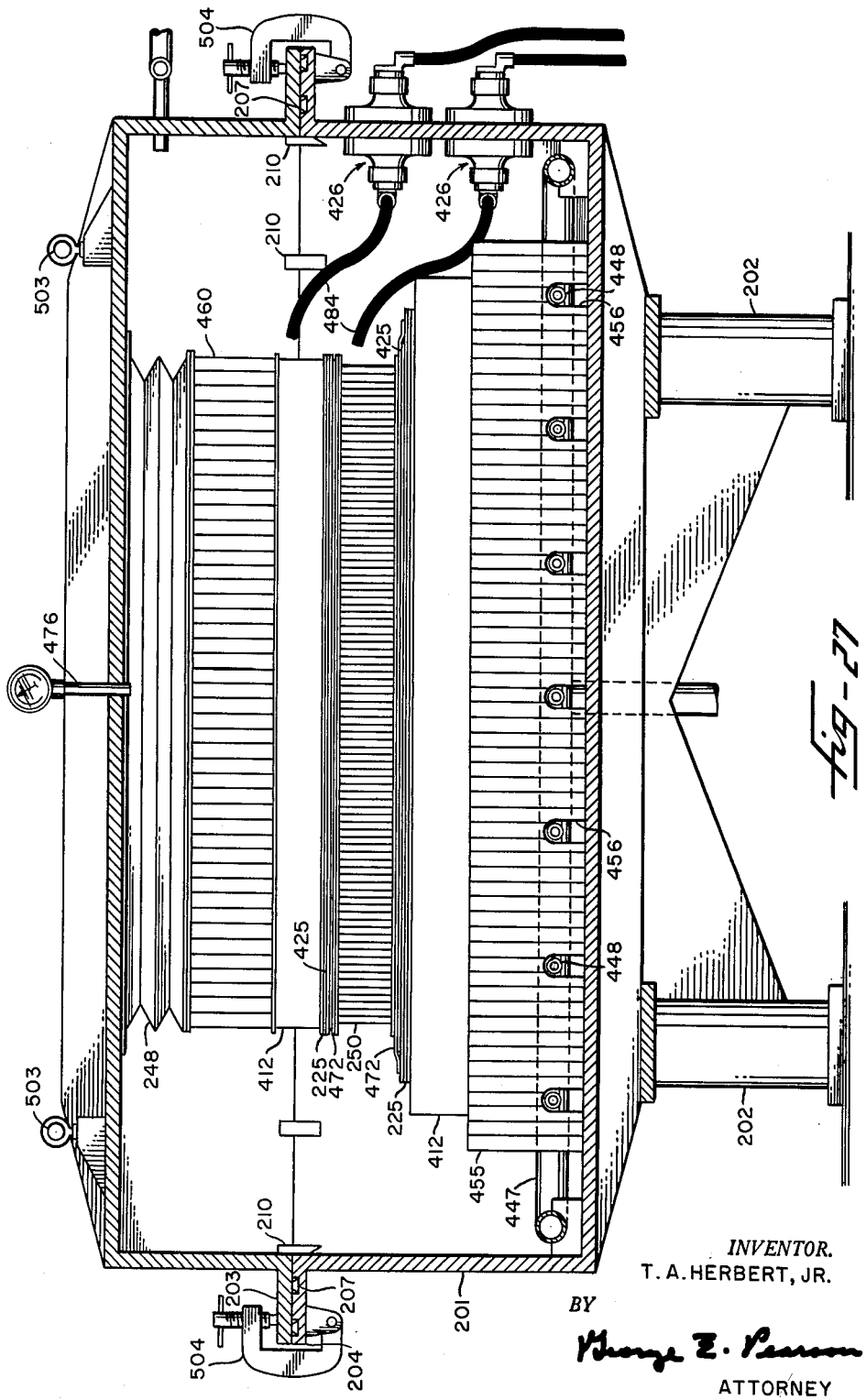

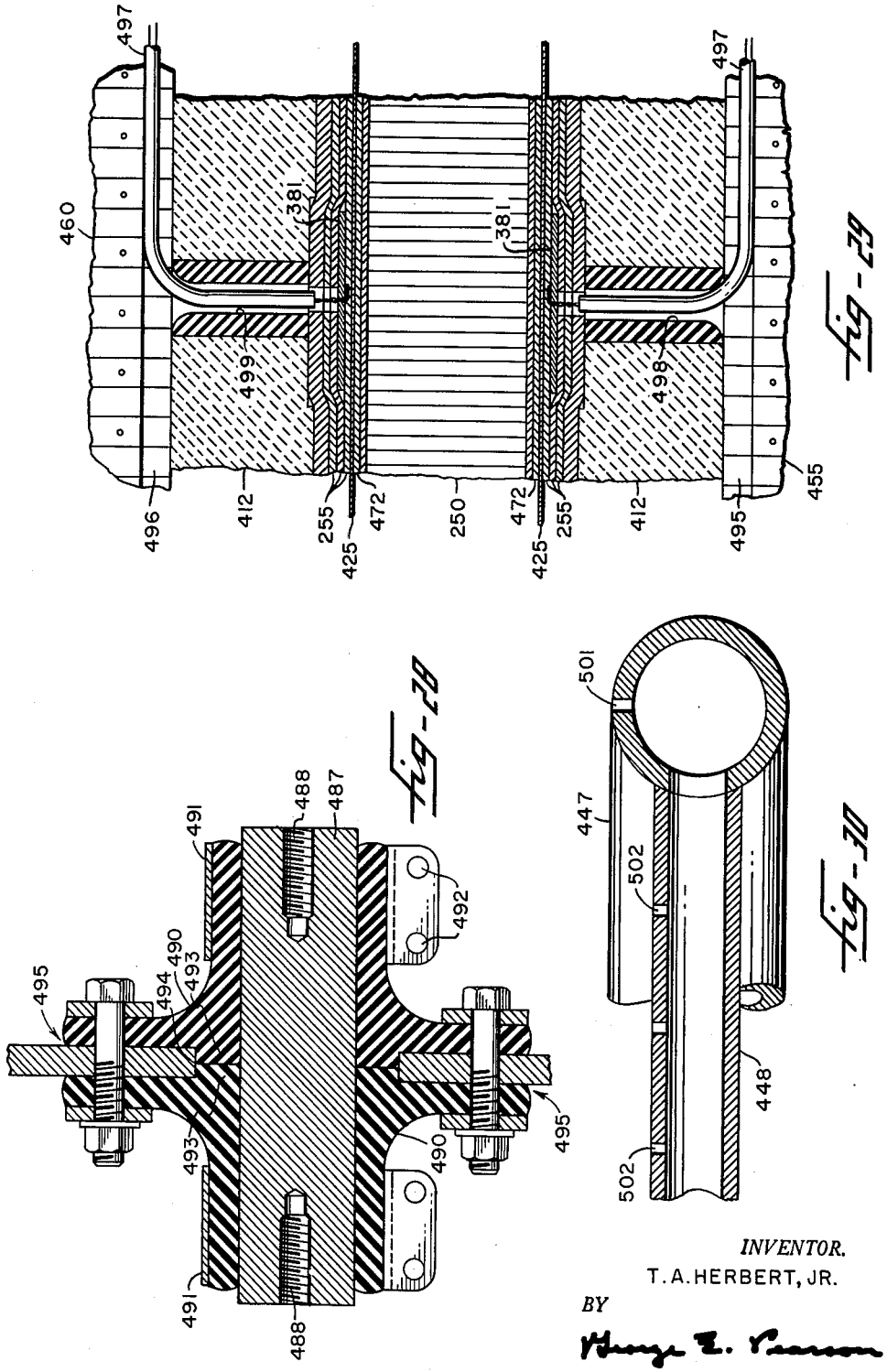

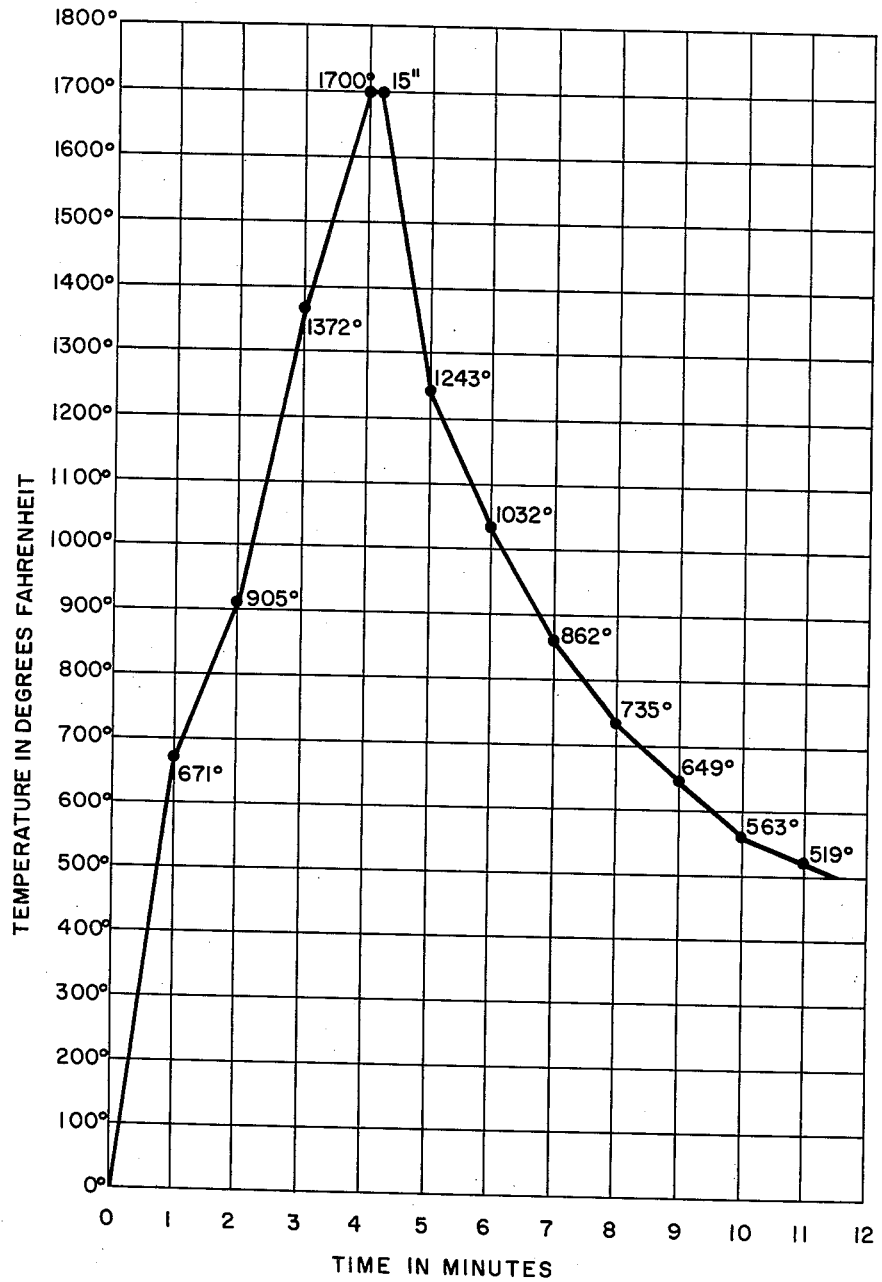

United States Patent Office 3,033,973
Patented May 8, 1962

3,033,973
APPARATUS AND METHOD FOR BRAZING
HONEYCOMB SANDWICH PANELS
Thomas A. Herbert, Jr., San Diego, Calif., assignor to Rohr Aircraft Corporation, Chula Vista, Calif., a corporation of California
Filed Jan. 11, 1961, Ser. No. 82,097
11 Claims. (Cl. 219—85)

This invention relates to a method and apparatus for brazing and more particularly to a method and apparatus for brazing the ends of a metallic cellular core to the opposing faces of two spaced apart metallic skins to produce a honeycomb sandwich panel.

This application is a continuation-in-part of my application for Apparatus and Method for Brazing Honeycomb Sandwich Panels, Serial No. 661,517, filed May 24, 1957, now Patent No. 2,984,732.

In the construction of metallic honeycomb sandwich panels it is customary to place the skins and core in assembled relationship on a suitable support with a thin layer of brazing material disposed between the ends of the core and the opposing faces of the skins. The support and assembled skins and core are then placed in a suitable container from which air is withdrawn and replaced with an inert gas to prevent oxidation of the metal by the high brazing temperatures, and the entire assembly is then placed in a furnace and heated to a brazing temperature. The heating process is necessarily slow since the container and support must be heated to a brazing temperature as well as the skins and core and upon completion of the heating process a long period is required to cool the container and support sufficiently to permit removal of the completed panel. Also, since the support and container must be constructed to withstand the high brazing temperatures, their cost is relatively high so that the cost of producing metallic sandwich panels in this manner is excessively high due to the length of time required to perform the brazing operation and the cost of the equipment used.

In accordance with the brazing process and apparatus of the present invention, the brazing heat is generated electrically and locally within the immediate vicinity of the panel to be brazed where it is actually needed and transferred thereto by conduction from graphite heating means which also serves as a temperature stable reference platform for the assembled panel. The panel is urged and held in assembled relationship during the brazing cycle by any means suitable for the purpose such, for example, as by use of weights or a pressure pad.

The graphite means may take the form of a single slab of graphite which serves both as the heater element and the reference platform, or the graphite means may comprise a composite of heater and reference structures, both formed of graphite. As a composite structure, the graphite means may comprise a relatively massive slab of graphite which serves as the reference platform and one or more relatively thin graphite elements which are supported on the reference slab and insulated therefrom and from each other to thus concentrate the heating zone more or less within a surface area disposed substantially in face adjacency with a surface of the panel being brazed. The graphite means thus provides a heating zone which is localized relative to the panel assembly while, at the same time, retaining the reference platform function of the massive slab of graphite. In the preferred form of the composite graphite means the graphite heating elements preferably are formed of graphite cloth which serves to localize the plane of the heating zone relative to the panel being brazed to thus greatly reduce the time of the brazing cycle and the time required to subsequently cool the brazed panel. The graphite cloth also provides a flexible heater structure well adapted to cushion the apparatus and panel structures against thermal and other shocks, and further facilitates the adaptation of the heating elements, as required, to conform to the varying configurations of panels of different shapes.

In the use of the graphite cloth heaters, the same preferably are employed on both sides of a panel being brazed, and a reference graphite slab is associated with each heater. One or more cloth heater elements may be separately or cooperatively employed and energized within a common plane in the heating zone on each side of the panel, or the same may be employed in successive layers arranged to produce concentrated heating effects or "hot spots," as required, within the heating plane. The graphite cloth, moreover, may ideally serve as a slip sheet between the panel and the dielectric means employed as the medium for transferring the heat between the panel and the graphite cloth employed as the heating elements.

The energization of the graphite heating means, in its several forms, is controlled and regulated manually or automatically, as required, through the use of saturable reactors and associated magnetic amplifiers and strip chart controllers which may be set to supply full heat and terminate the energization of the heating means at or near the peak temperature in the brazing cycle, or the same may be programmed to provide a predetermined rate of temperature rise during the brazing cycle as sensed, in either case, by thermocouples associated with the heating means or with the panel being brazed within the brazing zone. In the brazing of asymmetrical panel assemblies, provision is made for controlling the energization of the heating element or platen associated with the panel portion which, being more massive, or of greater density, for example, will experience the slowest rate of temperature increase, and the controller for this platen is made to serve as the master controller. The controllers for the other platens associated with other portions of the asymmetrical panel are made to serve as slave controllers and their associated platens made to serve as slave platens whereby the heat generated electrically at the slave platens is made to follow the rate of temperature rise in the master zone. This is accomplished, by way of example, by provision of thermocouples arranged to sense the temperature difference in the master zone and each of the slave zones.

Flexible heat-resistant dielectric cloth or fabric sheet materials are employed to electrically insulate the graphite heaters from the panel while providing virtual transparency to the transfer of heat by conduction therebetween. Such materials by reason of their flexible, yieldable and resilient qualities also serve to cushion the panel and associated brazing structures against shock while also having the quality of conforming to various panel and reference slab configurations. Such materials, moreover, have the quality, unlike the reference graphite slabs, of yielding, particularly within the thickness dimension of the dielectric cloth, to such distortion of the metallic panel structure as may occur due to the brazing heat, whereby the development of heat transfer voids in the heat transfer path afforded by the dielectric cloth are avoided and the continuity of the heat transfer is maintained uniformly over the area of heat transfer between the panel and the graphite heating elements.

The panel being brazed and the graphite heating and reference means and associated elements are enclosed in a medium of low thermal conductivity which, in one form of the invention, may comprise rigid refractory material, but preferably is in the form of the inert purging gas which is required in order to provide a non-oxidizing atmosphere both for the stainless steel panel assembly and the graphite means. In the latter arrangement, the graphite heating and reference means preferably is mounted more or less centrally within a stainless steel brazing box enclosing the non-oxidizing gaseous atmosphere. By reason of this arrangement, and the localizing of the heat generation relative to the panel being brazed, the resulting temperature gradient between the panel assembly and the brazing box is such that an operator may place his bare hand on the brazing box without experiencing discomfort notwithstanding the fact that the panel assembly may be at a brazing temperature of the order of 1680° F. The generated heat however is sufficient to liquify the brazing alloy and raise the component panel surfaces to a temperature sufficient to produce a sound and uniform braze. The brazed panel, and other materials used in the brazing box during the brazing cycle, moreover, can be handled with the bare hands within a few minutes after the brazing box has been opened. The only parts that experience the elevated temperatures during the brazing cycle are the graphite heating elements, the several sheets of dielectric cloth material and the stainless steel components and brazing alloy which make up the panel assembly.

In a typical brazing operation conducted in accordance with the furnaceless brazing process and preferred form of apparatus of the present invention, the panel to be brazed is sandwiched in between two sheets of graphite cloth heater material with suitable sheets of dielectric cloth material interposed therebetween, and thermocouples are placed at intervals within this sandwich to record heat at various parts of the panel. The thermocouples show a uniform heat distribution over the area of the panel during the heating period and uniform cooling when brazing temperature has been reached and the power is cut off. Uniform heating and cooling, plus even pressure on the panel assembly, prevent disfiguring distortion of the panel assembly. A typical brazing cycle, moreover, on panels of production size is of the order of about thirty minutes as compared to the order of twenty-three hours of brazing time required in the so called "brazing furnaces," or the order of about six hours as required with metallic strip heaters in the so-called "brazing blankets." Destruction and X-ray tests, furthermore, show that panels brazed within the graphite heated brazing box of the present invention exhibit uniformly high quality in panels ranging in thickness up to the order of four inches.

It is, therefore, the principal object of this invention to provide a method and apparatus for brazing metallic honeycomb sandwich panels in which the brazing operation is performed quickly through the use of relatively inexpensive equipment.

A further object is to provide a brazing apparatus wherein the brazing operation is performed in a non-oxidizing atmosphere.

Another object is to provide a method and apparatus for brazing metallic sandwich panels of various shapes and configurations.

A further object is to provide an apparatus for brazing metallic sandwich panels in which the skins and core are supported and firmly held together in assembled relationship during the brazing operation.

Another object is to provide a method and apparatus which is simple, inexpensive and highly efficient.

Another object is to provide an apparatus containing a heating means for performing the brazing operation without the use of a furnace.

Another object is to provide a furnaceless brazing method and apparatus which will greatly reduce the time required during the heating and cooling cycle to the order of minutes as compared with the several hours required in the prior art methods.

Another object is to provide a furnaceless process for brazing metallic honeycomb sandwich panels in which graphite means is utilized to generate the brazing heat in proximity to the panel assembly while also serving as the temperature stable platform for the assembly.

Another object is a furnaceless brazing process wherein the brazing heat is generated electrically in proximity to a panel to be brazed is to transfer the generated heat to the panel assembly by conduction through a heat-transfer medium which serves to electrically insulate the panel assembly from the source of heat and additionally serves to provide a cushion support for the panel assembly in a manner to insure the continuity and uniformity of heat transfer thereto.

Still another object is to provide graphite heater means in the form of flexible sheets or both.

Still another object is to provide a furnaceless brazing process and apparatus for generating the brazing heat locally in proximity to a panel to be brazed and having provision for sensing the temperature of the heat so generated and further provision for controlling the electrical generation of the heat in accordance with the temperatures so sensed.

An additional object in furnaceless brazing methods and apparatus of the character disclosed is to provide a master-slave control system for sensing and controlling the heat developed by master-slave heating elements disposed in heat conducting and transferring relation to asymmetrical portions of a panel assembly to be brazed.

Yet another object is to provide a brazing process having provision for brazing a metallic honeycomb sandwich panel structure while sandwiched between graphite cloth heating elements.

Still another object is to braze metallic honeycomb panel structures within an inert atmosphere enclosed by a brazing box having provision for generating brazing heat of the order of 1800° F. while maintaining the exterior of the box substantially at ambient temperature.

These and other objects and advantages will become apparent as the description of the invention proceeds.

For a better understanding of the invention reference is made to the accompanying drawings illustrating preferred and alternate embodiments thereof and in which:

FIG. 1 is a front view of the apparatus mounted in a press in which the system for withdrawing air therefrom and directing an inert gas thereinto is shown schematically.

FIG. 2 is an end view of the apparatus;

FIG. 3 is a view taken on line 3—3 of FIG. 2 with certain elements used in the brazing process omitted for clarity;

FIG. 4 is a view taken on line 4—4 of FIG. 3;

FIG. 5 is an enlarged view in section of part of the apparatus;

FIG. 6 is a view taken on line 6—6 of FIG. 1 with portions of the structure cut away to show its construction;

FIG. 7 is a view taken on line 7—7 of FIG. 1;

FIG. 8 is an enlarged sectional view of a portion of the apparatus and the sandwich panel to be brazed, illustrating the various elements used in the brazing operation;

FIG. 9 is an enlarged top view of a part of the apparatus shown in FIG. 6 with portions cut away to show its construction;

FIG. 11 is a transverse sectional view of the apparatus of FIG. 10 as viewed along the lines 11—11 of FIG. 12;

FIG. 12 is a longitudinal sectional view of the alternative embodiment of the apparatus and showing the complete brazing box assembly;

FIG. 13 is an enlarged detail view of the terminal posts employed with the graphite heater element disclosed in the apparatus of FIGS. 10 to 12;

FIGS. 14 and 15 are fragmentary sectional views respectively illustrating the hermetical sealing arrangement for the brazing box just prior to and after assembly of the two portions of the box;

FIG. 18 is a transverse sectional view, somewhat enlarged and partially broken away, of the apparatus disclosed in FIG. 16 and as viewed along the line 18—18 of FIG. 17;

FIG. 19 is a diagrammatic view of an electrical system for supplying and controlling the current to a graphite heater element or platen;

FIG. 20 is a block diagram view of an electrical system suitable for use in controlling the brazing heat supplied to different portions of a panel of variable density in accordance with the rate of heat rise of a predetermined selected portion of the panel;

FIGS. 21 to 24 are schematic views of brazing apparatus constructed in accordance with the preferred embodiment of the present invention and illustrating structural variations of such apparatus to adapt the same to panel assemblies of different structural configurations;

FIG. 25 is a view in perspective of brazing apparatus embodying the schematic disclosures of FIGS. 21 and 22, certain parts being removed and other parts broken away to show the details of construction;

FIG. 26 is a longitudinal sectional view of the apparatus disclosed in FIG. 25 as viewed substantially along the lines 26—26 thereof;

FIG. 27 is a transverse sectional view taken along the lines 27—27 of FIG. 26;

FIG. 28 is a detail sectional view taken along the lines 28—28 of FIG. 26;

FIG. 29 is a fragmentary sectional view as seen along the lines 29—29 of FIG. 26;

FIG. 30 is a detail sectional view as seen along the lines 30—30 of FIG. 25; and FIG. 31 is a chart indicating the time-temperature relation in a typical brazing cycle obtained in the use of the apparatus of FIGS. 25 to 30.

Figure 10:
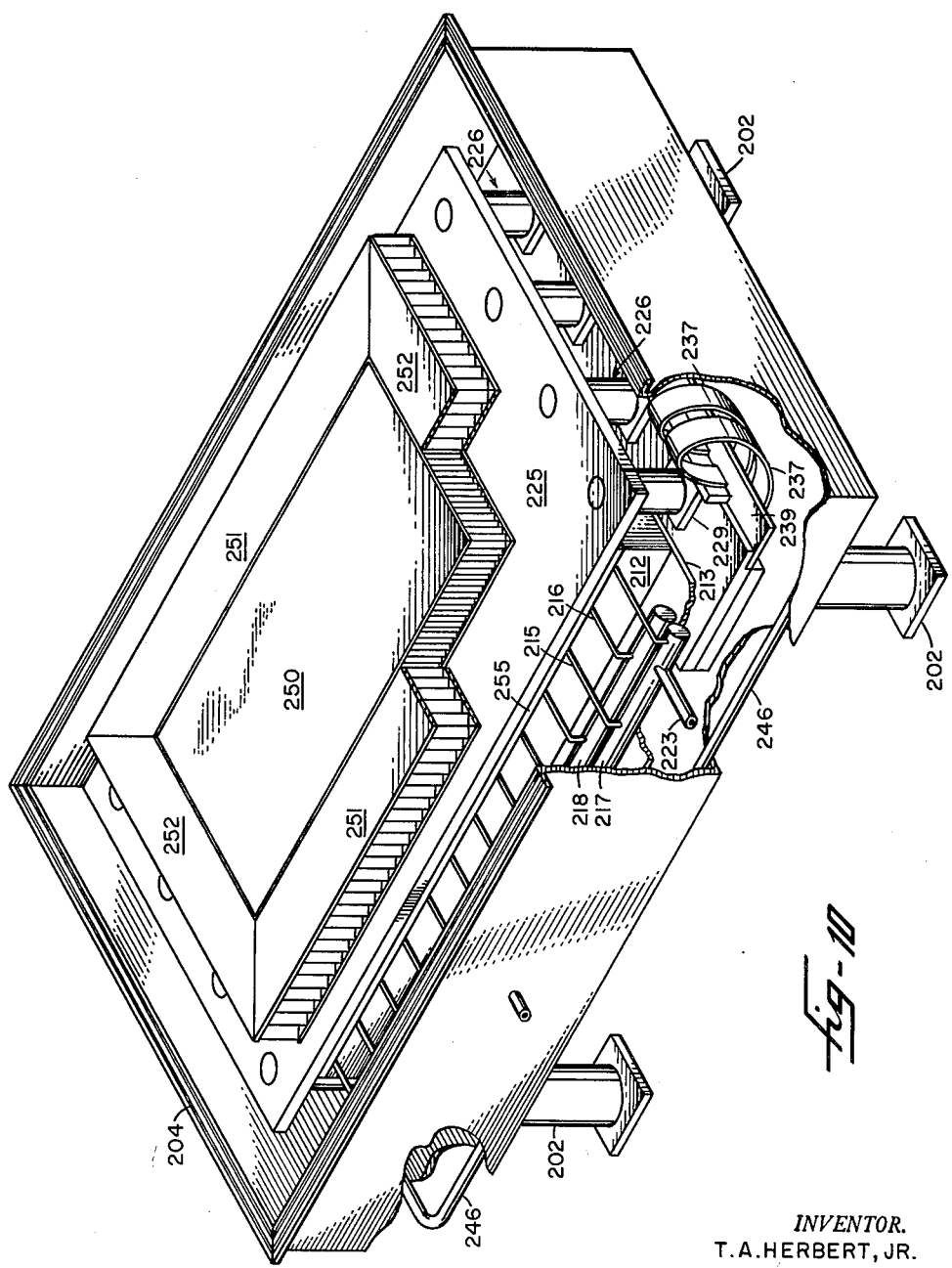
FIG. 10 is a view in perspective of an alternative embodiment of apparatus suitable for practicing the process of the present invention, the cover portion of the brazing box being removed.

With reference to FIG. 3 of the drawings the apparatus comprises a lower body member 10 which includes a block 11 of low thermal conductivity, hardened castable refractory material having a rigid metal shell 12, preferably of stainless steel, extending along its sides and a metal base 13 connected to shell 12. The upper face 15 of block 11 is provided with a recess 16 having a lower surface 17 provided with intersecting grooves 18 and the lower face 19 of block 11 is provided with spaced apart cavities 20 and 21 which extend the length of recess 16 beneath opposite sides thereof. A series of cylindrical openings 22 extend upwardly through block 11 from cavity 20 into recess 16 and similar openings 23 extend upwardly through block 11 from cavity 21 into recess 16.

A solid graphite electrical resistance heating element 24 is positioned in recess 16 and is prevented from contacting the walls of the recess by a layer of heat-resistant cloth or fabric material 25 disposed therebetween. The heat-resistant material serves to cushion the graphite heating element 24 against thermal and other shocks and affords such electrical insulation as necessary to augment that afforded by the refractory material of block 11. Any cloth or fabric material suitable for the purpose may be employed such, for example, as Fiberfrax and Refrasil manufactured respectively by Carborundum Corporation and H. I. Thompson Corporation.

Positioned in each of openings 22 is a graphite electrode 26 having a diameter slightly smaller than opening 22 to permit the passage of gas therealong for a purpose to be explained. The upper end 27 of each of electrodes 26 is reduced in diameter and threaded for engagement in a similarly threaded opening 28 in element 24 and the lower ends 29 of electrodes 26 extend into cavity 20. A graphite electrode 30 similar to electrodes 26 is positioned in each of openings 23, electrodes 30 having a diameter slightly smaller than the diameter of openings 23 to permit passage of gas therealong for a purpose to be explained. The upper ends 31 of electrodes 30 are reduced in diameter and threaded for engagement in similarly threaded openings 32 in element 24 and the lower ends 33 of electrodes 30 extend into cavity 21. Heating element 24 and electrodes 26 and 30 are preferably composed of solid graphite and electrodes 26 and 30 are preferably of such size that the total cross sectional area of either electrodes 26 or electrodes 30 is equal to at least twice the cross sectional area of heating element 24. The upper surface 34 of heating element 24 is shown flat and arranged to support a flat honeycomb sandwich panel 35 in assembled position. However, as will more fully appear as the description proceeds, surface 34 may be shaped as necessary to support panels of various shapes such as curved or tapered. In this respect, heater element 24 also serves as a temperature stable reference platform in the well known manner of use of graphite tooling in the prior art furnace brazing of metallic honeycomb sandwich panels.

The graphite slab or block 24 thus provides several significant functions in the furnaceless brazing process and apparatus of the present invention. It is an electrical heating element, and as such, is the means by which the brazing heat is developed upon passing of electrical current through the graphite block. Graphite has many characteristics by which it lends itself ideally for the brazing of honeycomb sandwich panels wherein extremely high temperatures are required to bond the skins to the core. Unlike metallic electrical heating elements, the graphite block is able to withstand temperatures upwards of 6,000° F. and, unlike metals, the graphite has a negative temperature coefficient of resistivity whereby its resistance when heated is about half of that when initially cold with the result that it passes more current and serves the purposes of developing the brazing heat that much more effectively. The graphite block also is an efficient heat transfer medium whereby the heat generated thereby upon current passing therethrough is effectively passed on and into the sandwhich core structure to effect the brazing together of the core and skins. The graphite block, moreover, has a low thermal coefficient of expansion and by reason of this characteristic further has the very important function, as aforenoted, of providing a temperature stable platform against which the assembled core and skins may be pressed with the assurance that the assembly will not be warped with a resultant undesired contouring of the sandwich structure upon cooling due to the fact that the graphite block does not become distorted with increases in temperature.

A pair of electrical connectors 36 and 37 arranged for connection to a source of electrical current (not shown) are positioned in and extend through an opening in base 13 and are held in spaced apart positions and insulated from bottom 13 and from each other by a plate 38 of rigid dielectric material surrounding connectors 36 and 37 and forming a closure for the base opening. A layer of cloth or fabric 39 such, for example, as Fiberfrax or Refrasil is interposed between plate 38 and connectors 36 and 37. Connector 36 is attached to a bar 40 composed of metal having a high electrical conductivity, which extends into cavity 20 and has an end section 41 extending the length of cavity 20 beneath electrodes 26. Each of electrodes 26 has a clamp 42 secured thereto adjacent lower end 29 by means of a bolt 43. Clamps 42 are provided with passages 44 extending therethrough one end of which is connected to an inlet pipe 45 extending into cavity 20 through bottom 13, by a flexible connection 46 and the other end is connected to an outlet pipe 47 extending from cavity 20, by a flexible connection 48 to permit a stream of coolant to pass through clamps 42. Each of clamps 42 is connected to end section 41 of bar 40 by a pair of electrical connectors 49 (see FIG. 4) each of which has one end 50 connected to clamp 42 by means of screws 51 and the other end 52 connected to end section 41 by means of screws 53. Connectors 49 are preferably composed of laminated metal having high electrical conductivity and shaped as shown in FIG. 3 of the drawing. The elements connecting electrodes 30 and connector 37 are identical to those connecting electrodes 26 to connector 36 and for clarity are indicated by the same reference numbers primed. Connector 37 is attached to a bar 40' similar to bar 40 and having an end section 41' extending the length of cavity 21 beneath electrodes 30. Each of electrodes 30 has a clamp 42' similar in all respects to clamp 42, secured thereto by a bolt 43'. Clamps 42' are provided with passages (not shown) similar to passages 44 in clamp 42, extending therethrough which are connected to inlet pipe 45' and outlet pipe 47' extending into cavity 21 through bottom 13, by means of flexible connections 46' and 48' to permit a stream of coolant to pass therethrough. Each of clamps 42' is connected to end section 41' by a pair of electrical connectors 49' similar to connectors 49, each connector having one end 50' secured to a clamp 42' by means of screws 51' and the other ends 52' secured to end section 41' by means of screws 53'. Base 13 is provided with an opening 54 under cavity 20 having a suitable removable closure 55 disposed thereover and an opening 56 under cavity 21 which has a similar closure 57. A pipe 58 passes through closure 55 and extends into cavity 20 and a similar pipe 59 passes through closure 57 into cavity 21 for a purpose to be explained. A pipe 60 extending upwardly through base 13 and block 11 adjacent one side thereof terminates in a pipe 61 contained in a groove 62 in surface 15 of block 11, pipe 61 being provided with spaced apart openings 63 (see FIG. 6) along its entire length. A pipe 64 similar to pipe 60 extends upwardly through base 13 and block 11 at the opposite side thereof which terminates in a pipe 65 contained in a groove 66 in surface 15 of block 11, pipe 65 being provided with spaced apart openings 67 along its entire length. Both of pipes 61 and 65 are provided with suitable end closures (not shown).

An angle iron 68 secured to shell 12 and extending entirely around lower body member 10 is provided with spaced apart openings 69 each of which is adapted to receive a threaded bolt 70 which is adjustably secured therein by a pair of lock nuts 71. Secured to the upper end 72 of each of bolts 70 is a bar 73 positioned parallel to shell 12 and provided with spaced apart openings 74 (see FIG. 2) in each of which an upwardly projecting pin 75 is slidably contained. A small block 76 is secured to the upper end 77 of each of pins 75 and a spring 78 surrounding pins 75 between bar 73 and block 76 resiliently urges block 76 and pins 75 upwardly. A hollow tubular member 79 having a rectangular shape in section and extending around body member 10 is secured to and supported on blocks 76. Tubular member 79 is provided with an inlet 80 at one end 81 thereof and an outlet 82 at the other end 83 thereof (see FIG. 2) for a purpose to be explained.

An upper body member 84 comprising a block 85 of hardened castable material similar to that of block 11 and having the same size and shape as block 11, is provided with a metal shell 86 surrounding its sides which is connected to a metal plate 87 covering the upper surface thereof and an exposed lower surface 88 positioned over and spaced away from surface 15 of block 11. Upper body member 84 is supported over and movable toward and away from lower body member 10 in a manner and for a purpose to be described. Lower face 88 of block 85 is provided with a recess 89 in which a hollow metallic pressure pad 90 is contained which comprises an upper metal sheet 91 shaped to fit within recess 89 and a lower sheet 92 of thin relatively flexible metal having its edges 93 attached to the edges 94 of sheet 91. The lower surface 95 of sheet 91 and the lower surface 96 of sheet 92 are plated as with chromium and polished to a reflective surface for a purpose to be explained.

Pressure pad 90 is held in recess 89 by pins 97 extending through plate 87 and block 85 and having their lower ends 98 secured to sheet 91 as by welding. A pipe 99 passing through plate 87 and block 85 is secured to sheet 91 and opens into the interior of pressure pad 90 for a purpose to be explained. A pipe 100 passes through plate 87 and block 85 adjacent one side thereof and is connected to a pipe 101 contained in a groove 102 in surface 88 of block 85, pipe 101 being provided with suitable end closures (not shown) and spaced apart openings 103 (see FIG. 7) along its entire length. A pipe 104 passes through plate 87 and block 85 adjacent the other side thereof which is connected to a pipe 105 contained in a groove 106 in surface 88 of block 85, pipe 105 being provided with end closures (not shown) and openings 107 (see FIG. 7) along its entire length.

An angle iron 108, similar to angle iron 68, attached to shell 86 extends entirely around upper body member 84 and is provided with spaced apart openings 109 each of which is adapted to receive a threaded bolt 110 which is adjustably secured therein by a pair of lock nuts 111. A block 112 is secured to the lower end 113 of each of bolts 110 as by welding and a bar 114 secured to block 112 by means of bolts 115 (see FIG. 5).

A hollow tubular member 116 similar to tubular member 79 extends around upper body member 84 in vertical alignment with member 79 and is attached to bars 114 for support. Tubular member 116 is provided with an inlet 117 adjacent one end 118 and an outlet 119 adjacent the other end 120 for a purpose to be explained. A pair of metal sheets 121 and 122 (see FIGS. 3, 5 and 8) are positioned between opposing faces 88 and 15 of upper and lower body members 84 and 10 which extend along opposite sides of panel 35 and have converging edges 123 extending out between hollow tubular members 79 and 116. Disposed between sheets 121 and 122 and extending along one side of panel 35 is a pipe 124 provided with openings 125 (see FIGS. 3, 8 and 9) to which a pipe 126 passing through a flanged opening 127 in sheet 122 is connected, pipe 126 extending through block 11 of lower body member 10. A pipe 128 provided with openings (not shown) similar to openings 125, extends along the opposite side of panel 35 between sheets 121 and 122 and is connected to a pipe 129 (see FIG. 1) extending through lower body member 10, in a manner similar to that in which pipe 126 is connected to pipe 124. Sheets 121 and 122 are both provided with curved portions 130 disposed opposite each other to permit thermal expansion and contraction thereof during a brazing operation without causing the sheets to move or shift positions.

Upper body member 84 is provided with sealing member 131 extending entirely around it which has a flat portion 132 provided with elongated openings 133 (see FIG. 5) through which bolts 134 provided with clamping bars 135 pass into threaded openings 136 in shell 86 to adjustably secure member 131 thereto. A thin plate 137 secured to shell 86 by screws 138 and provided with a spacer 14 extends along portion 132 to hold member 131 against shell 86 to facilitate adjustment in the position of member 131 when bolts 134 are loosened. The lower end 139 of member 131 is provided with an outwardly projecting portion 140 under a flexible heat resistant gasket 141 formed of suitable cloth or fabric material such, for example, as Fiberfrax and Refrasil is positioned.

Lower body member 10 is provided with a sealing member 142 similar to member 131 which is adjustably secured to shell 12 in the same manner by a bolt 143 provided with a clamping bar 144 and thin plate 145 similar in shape and purpose to plate 137 (see FIG. 3) is secured to shell 12 by screws 146. The upper end 147 of member 142 has an outwardly projecting portion 148 which is in engagement with a flexible heat resistant gasket 149 similar to gasket 141. When members 131 and 142 are properly positioned and upper body member 84 is positioned so that faces 15 and 88 are spaced apart a desired distance, gaskets 141 and 149 are pressed against sheets 121 and 122 and deformed to press outwardly against tubular members 79 and 116 in sealing contact therewith to form an effective seal between body members 10 and 84 on each side of sheets 121 and 122.

With reference to FIG. 1 of the drawing, lower body member 10 is shown supported in a stationary position on rails 150 secured to the bed 151 of a small press 152 of a known type. Press 152 is provided with a ram 153 connected to and movable vertically by a hydraulic cylinder and piston assembly 154 to which upper body member 84 is secured by a known means (not shown) directly over lower body member 10 for movement toward and away from member 10.

To prepare the apparatus and assemble the panel for brazing, upper body member 84 is raised and a sheet 155 of flexible, compressible and yieldable heat resistant and heat conductive dielectric cloth or fabric material such, for example, as Fiberfrax and Refrasil is placed on surface 34 of heating element 24 (see FIG. 8) and sheet 122 is placed thereon. A relatively rigid metal sheet 156 is placed on sheet 122 and lower skin 157 of panel 35 is placed thereon. A thin sheet of brazing alloy 158 is placed on skin 157 and a metallic cellular core 159 is placed on the brazing alloy together with suitable panel edge members 160. A thin sheet of brazing alloy 161 is placed on core 159 and members 160 and upper skin 162 of panel 25 is placed thereon. A metal sheet 163 similar to sheet 156 is placed on skin 162 and metal sheet 121 is placed thereon over which a sheet 164 of flexible cloth or fabric material similar to sheet 155 is placed.

The area surrounding panel 35 between sheets 156 and 163 is provided with a supporting element 165 which is composed of thin corrugated metal strips extending between sheets 156 and 163 to prevent any bending or deformation thereof.

Bolts 70 and 110 are adjusted in openings 69 and 109 to position tubular members 79 and 116 so that when upper body member 84 is properly positioned relative to lower body member 10 for the brazing operation, sheets 121 and 122 are pressed against tubular member 79 by tubular member 116 with sufficient force to compress springs 78 a small amount so that the sheets are tightly gripped between the tubular members. A resilient gasket 166 (see FIG. 5) is placed between sheets 121 and 122 adjacent edges 123 thereof to provide a seal against the passage of gas from between the sheets when the sheets are gripped between tubular members 79 and 116. A narrow strip 167 of flexible heat-resistant cloth or fabric material such, for example, as Fiberfrax and Refrasil is also placed between sheets 121 and 122 inwardly from gasket 166 to prevent gasket 166 from being damaged by the heat of the brazing operation. Sealing members 131 and 142 are also adjusted to a position in which gaskets 141 and 149 are pressed against 121 and 122 and deformed to press outwardly against tubular members 79 and 116 in sealing contact when upper body member 84 is lowered into position for the brazing operation.

A water inlet pipe WIn (see FIGS. 1 and 2) is connected to inlets 80 and 117 in ends 81 and 118 of tubular members 79 and 116 and a water outlet pipe WOut is connected to outlets 82 and 119 in ends 83 and 120 thereof to circulate cooling water through tubular members 79 and 116 to thereby cool edges 123 of sheets 121 and 122, thus providing gasket 166 with further protection from damage by the brazing heat. Inlets 80 and 117 and outlets 82 and 120 are arranged so that water flows in one direction through tubular member 79 and in the opposite direction through tubular member 116 so that edges 123 are cooled to a uniform temperature along their entire length.

Upper body member 84 is positioned to perform the brazing operation by being lowered to a position directly over lower body member 10 and spaced therefrom a distance which permits lower sheet 92 of pressure pad 90 to be in firm contact with sheet 164 disposed on sheet 121. In this position tubular members 79 and 116 and sealing members 131 and 142 are positioned to perform their respective functions as above described.

With reference to FIG. 1 of the drawing the system for withdrawing air from within the panel and apparatus and directing an inert gas thereinto is shown comprising a first vacuum pump 168 connected to a valve 169 by a pipe 170. A stand pipe 171 is also connected to valve 169 by a pipe 172 and a pipe 173 connects pipe 126 to valve 169. Valve 169 is a known type which may be positioned by means of a handle H to connect pipe 173 to pipe 170 or to pipe 172. A second vacuum pump 174, similar to pump 168, is connected by a pipe 176 to a valve 175 similar to valve 169 and also provided with a handle H. A second standpipe 177 similar to standpipe 171 is connected to valve 175 by a pipe 178. A pipe 179 is connected to valve 175 to which pipes 104, 64 and 59 are connected, and which may be connected to either pipe 176 or 178 through valve 175 by movement of handle H. A container 180 of pressurized inert gas which is heavier than air, such as argon, is provided with an outlet pipe 181 having a valve 182 therein. A pipe 183 connects pipe 99 to pipe 181 which is provided with a pressure regulating valve 184 with which the pressure of the gas directed through pipe 99 into pressure pad 90 is controlled for a purpose to be explained. A pipe 185 connected to pipe 183 and provided with a valve 186 is connected to pipe 58, 60, 100 and 129 to conduct gas therethrough.

To perform the brazing operation valves 169 and 175 are positioned to connect pipes 173 and 179 with pipes 170 and 176 and pumps 168 and 174 are actuated. Air is withdrawn from between sheets 121 and 122 into pipe 124 through openings 125 therein and out through pipes 126, 173 and 170 to pump 168 and exhausted thereby. Air is withdrawn from the area between sheet 121 and face 88 of upper body member 84 into pipe 105 through openings 107 therein and out through pipes 104, 179 and 176 to pump 174 and exhausted thereby. Air is withdrawn from the area between sheet 122 and face 15 of lower body member 10 into pipe 65 through openings 67 therein and out through pipes 64, 179 and 176 to pump 174 and exhausted thereby. Air is withdrawn from cavity 20 through opening 22 along electrode 26, through grooves 18 in lower surface 17 of recess 16, through opening 23 along electrode 30 into cavity 21 and out through pipes 59, 179 and 176 to pump 174 and exhausted thereby.

As air is withdrawn from the various areas as above described, valves 182 and 186 are opened to permit the inert gas to replace the air being withdrawn. Gas is conducted into the area between sheets 121 and 122 through pipes 181, 183, 185 and 129 to pipe 128 and out through the openings therein and into the area between sheet 121 and face 88 of upper body member 84 from pipe 185 through pipe 100 to pipe 101 and out through openings 103 therein. Gas is conducted into the area between sheet 122 and face 15 of lower body member 10 from pipe 186 through pipe 60 to pipe 61 and out through openings 63 therein and into cavity 20 from pipe 185 through pipe 58. The gas entering cavity 20 passes through opening 22 along electrode 26, through grooves 18 in lower surface 17 of recess 16, through opening 23 along electrode 30 and into cavity 21.

The pressurized gas entering pressure pad 90 causes lower sheet 92 thereof to press downwardly thereby pressing panel 35 against element 24 with sufficient force to hold skins 157 and 162 in firm contact with the ends of core 159 during the brazing operation. The force with which sheet 92 presses against panel 35 may be varied by adjusting valve 184 to regulate the pressure of the gas admitted to pressure pad 90.

Pumps 168 and 174 are kept in operation until all of the air has been withdrawn from the entire structure and replaced with the inert gas. The pumps are then stopped and valves 169 and 175 are positioned to direct the gas from pipes 173 and 179 through pipes 172 and 178 into standpipes 171 and 177. The gas is permitted to flow until the standpipes are full of gas, the air having been ejected therefrom by the heavier gas entering at the bottom of the standpipes, and valve 186 is then closed to stop the flow of gas. Standpipes 171 and 177 are preferably at least six inches in diameter and ten to twelve feet in length so that the column of gas contained therein, since it is heavier than air, maintains a slight pressure on the gas contained in the various parts of the structure. In the event that any slight leakage develops in any part of the structure during the brazing operation the slightly pressurized gas escaping therethrough will prevent the entry of air thereinto which, if it reached the panel, would cause oxidation of the metal and render the completed panel unfit for its intended use.

Cooling water is directed to tubular members 79 and 116 and clamps 42 and 42' from a known source (not shown) in the manner previously described, and electrical current is directed through heating element 24 through electrodes 26 and 30. Since the cross sectional area of both sets of electrodes 26 and 30 is much greater than the cross sectional area of element 24, as previously described, the conductive capacity of element 24 is substantially less than that of the electrodes so that the current passing therethrough causes element 24 to become hot and by proper regulation of the current the element may thus be heated to a desired temperature.

The element is heated to a temperature sufficiently high to cause sheets 158 and 161 of brazing alloy to melt as the heat permeates panel 25. A relatively even heat is obtained throughout the panel by reason of the heat diffusing quality of the graphite heater element, the uniform heat conductive capacity of the cloth or fabric sheets 195 and 164, and by reason of the heat which passes through and reflected back to the panel by the polished surfaces 95 and 96 of sheets 91 and 92 pressure pad 90.

The inert gas surrounding electrodes 26 and 30 tends to prevent overheating of the electrodes and also prevent oxidation of clamps 42 and 42' and the metal parts connected thereto by the high temperatures to which they are subjected.

When panel 35 has been heated sufficiently to melt the brazing alloy, the flow of current through electrodes 26 and 30 is stopped and heating element 24 and panel 35 are allowed to cool to permit the brazing alloy to harden. To accelerate the cooling process pipe 58 may be disconnected from pipe 185 and pipe 59 disconnected from pipe 179 and a coolant gas, such as carbon dioxide, under pressure directed into pipe 58 to pass through cavity 20, opening 22, grooves 18, opening 23, cavity 21 and out of tube 59.

When panel 35 has been sufficiently cooled, valve 182 in line 181 is closed to stop the flow of gas to pressure pad 10 and upper body member 84 is raised by raising ram 153 to permit removal of panel 35 from between sheets 121 and 122.

In the furnaceless brazing method and apparatus thus far described, the brazing heat is generated internally and locally only by electrical means for passing current within an area closely adjacent to the brazing area in the region of one of the skins which is to be brazed to a honeycomb core to form a sandwich panel. The brazing heat in the region of the other of the skins being conducted thereto through the core and returned by reflection thereto in such region. The brazing heat is thus developed only locally where it is actually needed and thus greatly reduces the time required to reach brazing temperature as well as the time thereafter required to cool the panel. The amount of heat required to accomplish the brazing is also greatly reduced in contrast to that required in the so-called furnace brazing process wherein the entire furnace must be raised to a temperature greater than that required in the brazing area in order to compensate for heat losses and time lag in the transmission of heat through the muffle box, tooling and heat diffusing apparatus, and like devices required in conventional furnace brazing.

The local generation of the brazing heat electrically only within the brazing region, as in the present invention, has the advantage of avoiding excessive heating of the surrounding medium with the result that the heat may be rapidly withdrawn during the cooling cycle of the panel in contrast to the furnace heating methods wherein the heat stored in the excessively heated tooling and brazing fixtures must be withdrawn before the panel itself can be cooled as required during the cooling cycle. By way of contrast, a brazing and cooling cycle in the use of a large furnace may typically require a time of the order of 23 hours as compared to a brazing and cooling cycle in the use of the furnaceless brazing apparatus and process of the present invention wherein the panel may typically be brought up to brazing temperature of approximately 1700° F. in a period of time of the order of 26 minutes, and thereafter may be cooled for removal from the brazing apparatus within a period of time of the order of 3 hours and at a panel temperature of the order of 500° F.

The success of the furnaceless graphite brazing apparatus and method of the present invention is attributable to a large extent to the dielectric and heat transfer qualities of the fabric or cloth medium 155 interposed between the graphite heating element and the panel being brazed. The heat which is uniformly generated throughout the graphite block or slab 24 by reason of its multiplicity of current paths and its quality of diffusing the heat uniformly must be transferred to the panel assembly uniformly over the brazing area and with minimum heat loss while at the same time preventing arcing through from the graphite heater element to the panel and, additionally, maintaining structural integrity notwithstanding the high brazing temperatures encountered. To this end, the dielectric medium must provide adequate electrical insulation to prevent arcing while also being virtually transparent to the transfer of heat therethrough. The heat transfer medium must also be compressible and yieldable in its thickness dimension to thus provide a cushion support for the panel assembly on the temperature stable reference platform afforded by the graphite heater element. For this purpose, the heat transfer medium is adapted to yield to, and take up, the expansion, contraction, warping, and like distortion of the metallic panel assembly such as may develop due to the intensity of the brazing heat. Heating of the panel assembly will develop unevenly and fortuitously in accordance with the variations in the panel structure and mass, some of which will act as heat sinks to delay the rise in temperature while other structural members may experience a rapid rise in temperature. As a result, distortion in some portion of the panel area in engagement with the heat transfer medium is inevitable and the medium must be capable of yielding to such distortion in order to avoid the development of heat transfer voids in such area.

Fiberfrax and Refrasil, as aforedescribed, are suitable materials for use as the heat transfer medium as embodied in sheet form for the purpose of element 155. Fiberfrax dielectric sheet material is formed of fused silica and is a cloth material of the nature of felt. Fiberfrax sheet material of the order of .080" thickness will compress to the order of .010" under a compression load of approximately 2 pounds per square inch, from which compression it recovers with considerable springback, and when so compressed, effectively passes the heat therethrough uniformly over the area of heat transfer between the panel assembly and graphite slab heater element. Fiberfrax develops a slight waviness in response to the brazing which produces an imprint of the wavy pattern onto the skins of the panel. This, however, may readily be eliminated in the use of thicker metallic slip sheets 156 and 163 on opposite sides of the panel assembly. Fiberfrax remains flexible below brazing temperatures of the order of 1800° F. and its use preferably is limited to temperatures below this level since, at temperatures above 1800° F., it tends to sinter and on cooling becomes ceramic and brittle.

Refrasil dielectric sheet material is a cloth material which is woven into cloth from extruded quartz fibers and possesses all the desired qualities required for use with the graphite heater-reference slab. It is a good dielectric, has a high softening point ranging between 2900° F. and 3500° F., it is resilient, compressible, flexible, yieldable, and heat-resistant. It thus ideally serves as a cushion to absorb thermal and other shocks. It is also well adapted to maintain its structural integrity notwithstanding the elevated temperatures required for brazing and notwithstanding the stress to which it may be subjected both in its length and thickness dimensions during the generation and transfer therethrough of the brazing heat.

In its length dimension, the element 155 must be capable of elongating or otherwise yielding and conforming to the temperature-dimensional instability of the metallic panel assembly in engagement therewith on one side of the element while maintaining dimensional stability on the other face thereof in engagement with the temperature stable graphite heater slab 24 which does not deviate from its planar state as a reference plane or platform for the panel assembly. The metallic members of the panel assembly, for example, elongate with the increase of temperature to the brazing point, and the element 155 is thus called upon to flex or yield therewith on its surface in engagement with the panel assembly while conforming on its opposite surface with the unchanging state of the graphite slab. Since the panel members also tend to warp and deform in response to the brazing heat, the element is also called upon to yield in its thickness dimension in order to maintain heat transferring engagement with the panel and with the heating element to thus prevent the development of voids in the heat transfer path.

Thus, the element 155, in the brazing process, must be capable of changing its form while maintaining its structural integrity for efficient heat transfer; it must elongate, as required in its length dimension; it must compress or expand as required in its thickness dimension to respond to changes in pressure. Refrasil cloth, by virtue of its loose quartz fiber weave, ideally affords adequate dielectric qualities and is fully resistant to the brazing heat; and by virtue of its loose weave and compressibility, affords adequate cushion support for the panel on the graphite heater. Refrasil, moreover, is virtually transparent to the transfer of heat therethrough while having the further ability to avoid the development of heat transfer voids therein to thus provide for an efficient and uniform transfer of heat by conduction from the graphite slab to the panel assembly being brazed.

Single weight Refrasil cloth such as type C100–28 may be used singly or in multiple layers, with satisfactory results. Double weight material such as Refrasil C100–48, which has a more coarse or loose weave than that of the C100–28, however, is preferred where longer life, greater arc protection, and higher degree of heat transparency are required.

The apparatus thus far described is thus well adapted to practice the principal steps of the furnaceless brazing process of the present invention, namely, the first principal step of generating the heat electrically and uniformly over and within a panel supporting and heating surface disposed in heat conducting engagement with a panel to be brazed and having a surface area adjacent to and at least co-extensive with one of the skins of the panel; and the second principal step of uniformly transferring the generated heat to the panel by conduction through a flexible dielectric heat resistant medium interposed yieldably between the panel and its heat generating and supporting surface.

Pressure pad 90, likewise, contributes to the practice of the principal steps of the process of the present invention by maintaining the panel in assembled relationship on the reference-heater platform within the region of the generation and transfer of the brazing heat, and also serves by reflection to retain the generated heat within the region of brazing. The blocks 11 and 85 of low thermal conductivity material also serve to enclose the region of heat generation and transfer and thus retain the generated heat in the region of brazing where it is actually needed. The purging apparatus provides for practice of the steps of air withdrawal and replacement with an inert non-oxidizing gas, and alternatively, provides for the admittance of a cooling- or like medium, whereby the time required in the cooling portion of the brazing cycle may be substantially reduced.

The generated heat is so effectively localized in the region of brazing that the low thermal conductivity heat enclosing medium afforded by the refractory blocks 11 and 85 may be eliminated, along with associated structure, as disclosed in the improved and simplified brazing apparatus of FIGS. 11 to 15. In this apparatus, a light weight, two piece brazing box is employed which may be formed of any sheet material suitable for the purpose such, for example, as stainless steel. This box comprises a removable upper or lid portion 200 and a lower relatively fixed portion 201 which conveniently is positioned approximately table height above the floor as by the vertical supports 202. Box portions 200 and 201 have complementary rim or lip portions 203, 204 respectively by means of which the brazing box is hermetically sealed when the two cover portions are brought together in assembled relationship, as seen in FIG. 12, and clamped together, as by means of hand clamps, or grips, or the like (not shown).

As best seen in FIGS. 14 and 15, the upper surface of rim 204 is recessed as at 205 and 206 to provide a pair of perimetrical grooves into which endless seals 207 of triangular configuration are placed. Seals 207 have a central opening 208 and are formed of a suitable resilient material such, for example, as neoprene such that, when the rim portions are brought together as disclosed in FIG. 15, the seals 207 are compressed and distorted into sealing engagement with the lower surface of rim 203. More specifically, these seals are distorted sufficiently such that the upper apex of each seal is forced into the opening 208 therein to thus effectively provide three areas of sealed engagement with the confronting lower surface of rim 203, these concentrated pressure areas of engagement appearing generally as indicated by the arrows 209 in FIG. 15.

In order to facilitate aligning of the box portions during assembly, cover 200 may carry internally a permetrically extending guide plate 210 having a tapered edge portion 211 for guided engagement with box portion 201.

A graphite reference slab 212 is supported on a plate 213 which may be formed of any material suitable for the purpose such, for example, as stainless steel. Plate 213, in turn, conveniently may be supported from the sidewalls of the low box portion 201 as by a plurality of spaced support members 214 which may be welded or otherwise suitably secured to the sidewalls. The upper surface of slab 212 is provided with a plurality of spaced grooves or recesses for receiving spaced tubes 215 and alternately spaced tubes 216, which tubes respectively are secured on one side of the brazing box to header tubes 217 and 218 and on the other side to header tubes 219 and 220. Coolant fluid entering conduit 221 connected to header 220 passes through tubes 216 into header 218 and outwardly therefrom through conduit 222. Similarly, coolant fluid admitted into conduit 223 passes into header 217 to which it is connected and from thence through tubes 215 into header 219 and outwardly of conduit 224 connected thereto. By reason of this arrangement, coolant fluid at approximately the same temperature moves from both sides of the plane of heat generation to the opposite side and thus passes substantially uniformly across the upper surface of reference slab 212.

A suitable heat resistant and dielectric material is positioned on the upper surface of slab 212 and this preferably is in the form of one or more sheets 255 of Fiberfrax or Refrasil. A relatively thinner slab of graphite 225 is positioned on the dielectric material 255 and serves as the electrical heating element, the sheet material 255 serving both to cushion the thin heater element against shock and to electrically insulate the same with respect to the reference slab 212. By employing a composite graphite heater-reference slab in this manner, all of the desired characteristics of graphite material employed as a temperature stable reference platform are retained and, also, all of the desired characteristics of graphite material as an electrical heating element are likewise retained. In addition, the thin heater slab serves to concentrate the heat generation more nearly in the plane of the supporting engagement of the panel assembled for brazing on the composite heater-reference. Moreover, the composite structure simplifies the introduction of the coolant tubes 215, 216 therein which, thus positioned, readily and rapidly withdraw the brazing heat from the heater element 225 at the start of the cooling cycle.

Each end of heater element 225 has secured thereto in spaced relation thereon a plurality of graphite terminal posts 226, the details of which may best be seen in FIG. 13. One end of the post is reduced and formed for threaded engagement with the graphite heater element 225 as indicated at 227. The other end of the post is likewise reduced in diameter to receive, as indicated at 228, the opening in an L shaped metallic connector 229 which is a good electrical conductor such, for example, as copper. Post 226 has a threaded central bore for receiving a metallic plug or insert 230 which, like connector 229 is formed of a good electrical conductor such, for example, as copper, plug 230 being appropriately threaded for insertion into the threaded bore of the post 226. A threaded washer 231, in turn, is carried by the copper insert 230 to thus clamp the bracket 229 to the post and into electrical connection and engagement with the metallic insert 230. By reason of this arrangement, the post and heater element, being composed of the same material, have the same temperature response and, consequently, have the same dimensional stability. This assures that the connection between the post 226 and heater element 225 will be both structurally strong and electrically effective to pass the heater current. The copper insert 230 forms an adequate area of engagement with the graphite post and, by reason of the metal-to-metal engagement of the insert with the bracket 229 simplifies the manner of attachment of the leads to the electrical heater element.

In order to avoid a wide difference in the response of the copper insert and graphite post to changes in temperature which would normally occur due to the great difference between their temperature coefficients of expansion, the metallic insert 230 is provided, as at 232 with a channel therein to which conduits 233 and 234 are connected for the passing of coolant fluid received from headers 235 and 236. It will be understood that headers 235 and 236 may be connected to headers 217 to 220, or may be independently connected to external conduits in the same manner as these headers.

Connectors 229 have semi-flexible metallic leads or conductor strips 237 suitably connected electrically thereto in any well known manner, there preferably being two such leads connected to each connector 229. These strips 237, in turn, are suitably connected electrically to a common bus bar 238 at one end of the heater element 225, and the strips 237 at the other end of the heater element are similarly connected to a common bus bar 239. Bus bar 238, in turn, is connected electrically to a conductor plate 240, and bus bar 239 is similarly connected to a conductor plate 241. Conductor plates 240 and 241 terminate respectively in metallic posts 242 and 243 to which they are secured mechanically and electrically in any suitable manner. Each post 242, 243, preferably is bonded to a suitably shaped grommet 244 which may be formed of neoprene, or the like to mount and seal posts 242 and 243 within openings provided therefor in brazing box portion 201. By reason of this circuit arrangement and connection of parts, current received from a suitable source, at any instant, will pass from post 242 by way of conductor plate 240, bus bar 238, strips 237 and posts 226 to one end of graphite element 225, and thence by way of the graphite element to the posts 226 and strips 237 at the other end of the element, from whence the current will pass to bus bar 239 and thence by way of conductor plate 241 to post 243.

Air within the chamber of the brazing box may be withdrawn through outlets 245, FIG. 12, disposed at the ends of the box, and a suitable purging gas may be admitted into the box by way of a conduit 246 which extends in perimetrical fashion along the inner sidewalls and at the bottom of the box. A series of spaced holes or openings 247, FIG. 11, in tube 246 provide for escape of the purging gas and diffusion thereof throughout the chamber of the brazing box.

Box cover portion 200 preferably carries internally thereof a metallic pressure pad 248 into which a suitable gas under pressure may be passed by way of conduits 249. Pressure pad 248 preferably is secured to the box cover for movement therewith to and from assembled engagement with the lower box portion 201. It will be understood that use of the pressure pad is preferred, and the sandwich panel 250, accordingly, is shown interposed between the pad and the graphite element 225 for the purpose of illustrating the relationship between these parts. One or more weights placed upon the sandwich panel, however, may be used in lieu of the pad to retain the sandwich panel in assembled relationship during the brazing operation and with the required pressure applied thereto. Blocks of stainless steel honeycomb core 251 and 252, FIG. 10, may be placed around the sandwich panel and used as production aids in maintaining the panel in pre-brazed assembly.

In the brazing operation, one or more sheets, preferably of Refrasil, are interposed between the panel 250 and the heating element 225, and one or more sheets of this material are similarly positioned on top of the panel assembly. Thereafter, the cover 200 is assembled and sealed to the box portion 201. The air is next withdrawn from the sealed brazing chamber and replaced with a suitable purging gas to provide an inert atmosphere within the chamber. The required pressure is then developed within the pressure pad 248, and current is passed through the afore-described circuit, as required, to generate the brazing heat electrically, this being done much in the same manner as aforedescribed in connection with the apparatus of FIGS. 1 to 9.

In the use of the apparatus of FIGS. 12 to 15 during the brazing process, a high temperature gradient develops between the centrally localized region of generation of the brazing heat and the surfaces of the brazing box as evidenced by the suitability of the use of rubber, neoprene, and the like for the seals 207, grommets 244, and elements 253 and 254 employed respectively for mounting and electrically insulating conductor plates 240 and 241 with respect to the bottom of the brazing box. Although the temperature in the region of generation of the brazing heat may be in excess of 1800° F., the external surfaces of the brazing box remain sufficiently cool to be safely touched by hand.

This high temperature gradient is attributable to the centralized location of the region or zone of brazing heat generation within the brazing chamber and virtually enclosing and surrounding gaseous medium which acts as a poor conductor of heat from the brazing zone. Except for the headers and conduits, which are themselves cooled, and the pressure pad which encloses a large volume of gas and thus also serves the function of a heat transfer barrier, there are no direct metallic conductors of heat which may serve to draw the brazing heat by conduction outwardly from the heat generation zone to the walls of the brazing chamber. Accordingly, the generated heat is localized in the brazing zone, is rapidly developed to brazing temperature, and may rapidly be withdrawn during the cooling cycle while maintaining, all the while, the exterior surfaces of the brazing box substantially at room temperature.

Referring now to FIGS. 16 to 20, there is disclosed therein, an alternative form of apparatus for practicing the brazing process of the present invention wherein there is employed a brazing box 300, 301, similar to that of brazing box 200, 201 and similarly mounted with respect to the floor. The apparatus is generally similar to that disclosed in FIGS. 10 to 15 and, accordingly, wherever applicable, the same reference characters are employed to designate the same or similar parts.

Figure 16:
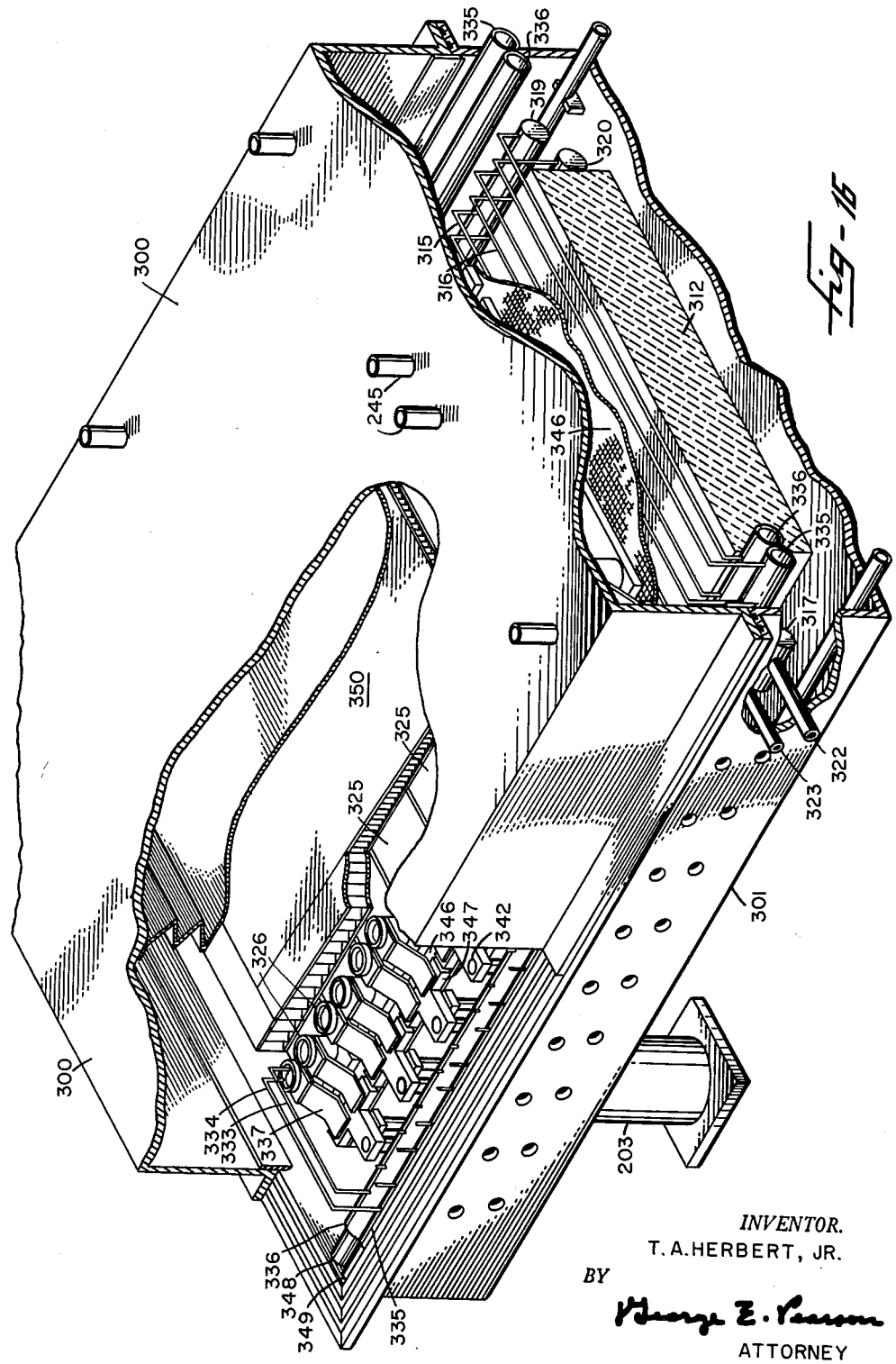
FIG. 16 is a view in perspective of another alternative form of apparatus for practicing the process of the present invention, certain parts being broken away to show details of construction.
Figure 17:
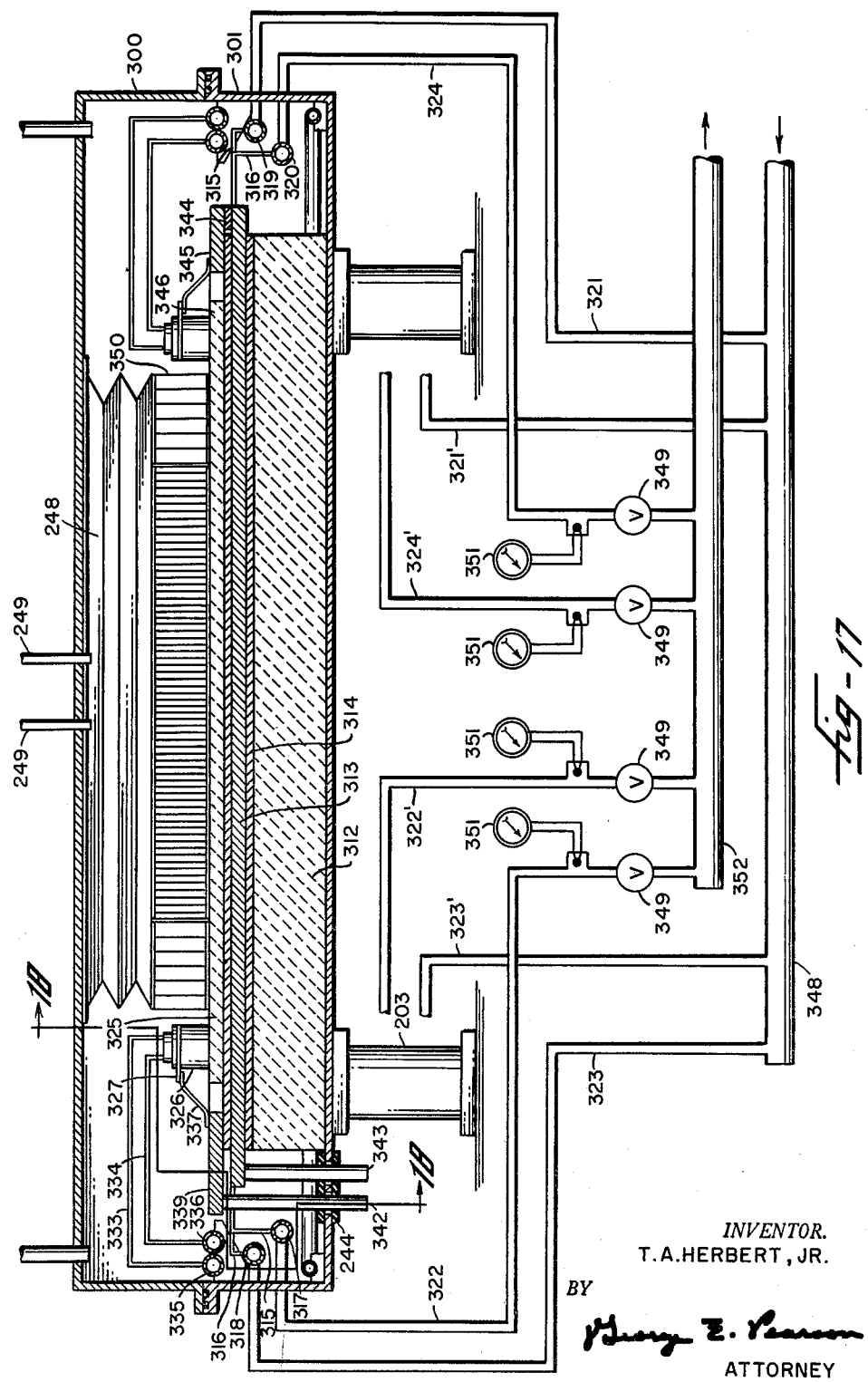
FIG. 17 is a longitudinal sectional view of the apparatus disclosed in FIG. 16.

As employed in FIGS. 16 to 18, a graphite reference slab or block 312 is supported directly on the bottom of the lower box portion 301, and is appropriately recessed in its upper surface (FIG. 18) to receive a plurality of spaced low resistance metallic conductor plates 313, suitable insulation such as one or more sheets 314 of Fiberfrax or Refrasil being interposed within each of the recesses between each plate 313 and the slab. Each of conductor plates 313 at one end thereof has a metallic terminal post 343 secured thereto in any suitable manner, and each post 343 extends outwardly of the lower box portion 301 through a grommet 244, in the manner previously described. Each plate 313 at the other end thereof is electrically connected as at 344 (FIG. 17) to a low resistance metallic terminal member 345, there being one such terminal member for each of plates 313.

A plurality of relatively thin graphite heater elements 325 are supported on conductor plates 313 individual thereto with one or more sheets 346 of Refrasil or Fiberfrax being interposed therebetween and extended generally over the upper surface of slab 312. Elements 325 are spaced from each other sufficiently across the width of the reference slab so as to maintain adequate electrical insulation between the several heater elements. Each of the heater elements 325, at each end thereof, is provided with a pair of terminal posts 326 which are constructed generally in the same manner as the aforedescribed posts 226. In the case of posts 326, the connector 327 of each has secured thereto a resilient spring-like metallic lead 337 which, in the case of posts positioned at one end of elements 325, may conveniently make a wiper type contacting engagement with a terminal member 345 disposed at such end of the elements. In the case of the posts at the other end of the elements, leads 337 therefrom may similarly make wiping contact with a T shaped metallic terminal member 347, there being one such T member for each heater element with the flexible leads 337 therefrom engaging the upper leg of the T and a suitable terminal post 342 being secured to the other leg of the T and extending outwardly of the brazing box through a grommet 244.

In accordance with the aforedescribed electrical arrangement, current from a suitable electrical source, at a given instant, will pass through each heater element by way of a circuit individual thereto and including, in series, a terminal post 343, conductor plate 313, connector 344, terminal member 345, a first pair of leads 337 and posts 326 at one end of the element, a second pair of posts and leads at the other end of the element, a terminal T member 347, and a terminal post 342.

As in the case of terminal posts 226, terminal posts 326 are similarly connected by conduits 333 and 334 to headers 335 and 336, and these, in turn, are connected respectively to conduits 348 and 349 (FIG. 16) which extend outwardly of the brazing box to a suitable source of fluid coolant.

Slab 312 is also appropriately recessed in its upper surface to receive a plurality of alternately spaced coolant conducting tubes 315 and 316 of which two of tubes 315 and two of tubes 316 constitute a cooling system for one of the heater elements, there being one such system for each element. Each pair of tubes 315 at one end thereof is connected to a header 317, and each pair of tubes 316 at one end thereof is similarly connected to a header 318. The other end of each pair of tubes 315 is connected to a header 319 and, similarly, the opposite end of each pair of tubes 316 is connected to a header 320.

Coolant fluid supplied from a suitable source to a distributor header 348 (FIG. 17) is conducted by way of a conduit 321 to header 319 and thence through tubes 315 to header 317 from which it passes by way of conduit 322 and a valve 349 to a return header 352 from whence it returns to the coolant source. Similarly, coolant fluid in header 348 passes by way of conduit 323 into header 318 from whence it passes along tubes 316 to header 320 and thence by way of conduit 324 and a valve 349 to the return header 352. Valves 349 may be manipulated, as required, to regulate the flow of the coolant fluid through the system to equalize the cooling rate at both ends of the heater element, as aforedescribed. A suitable gauge 351 is employed in each return line to indicate the rate of flow of coolant fluid therethrough. It will be understood that a coolant system such as described in the foregoing is employed with each of the heater elements 325 although only one complete such system is disclosed in FIG. 17. In FIG. 17, conduits designated 321', 322', 323', and 324' depict, by way of example, the conduits leading to the cooling system for a second heater element 325. Thus, by reason of this arrangement, the cooling rate at both ends of the heaters may be equalized and the rate of cooling across the length of the heater elements maintained substantially uniform and, in addition, the cooling rates, as well as the heating rates, of the several heaters may be controlled differently in accordance with a predetermined pattern such as may be dictated by a particular shape, configuration, or mass density of a panel assembly to be brazed and subsequently cooled.

Referring now to FIG. 19, there is disclosed thereon a complete electrical system for supplying current to graphite heating element such, for example, as one of elements 325, in a controlled variable amount in accordance with the requirements of the brazing cycle. The current is applied directly to the graphite element or brazing platen 325 from the secondary 360 of a transformer 361 whose primary winding 362 is connected on one side to a saturable recator 363 and on the other side by way of relay control contacts 364 and manually controlled contact 365 of a switch generally designated 366 to one side of a suitable A.C. power supply. The other side of the power supply similarly is connected by way of switch contacts 364 and 365 to the other side of saturable reactor 363. A second switch 367 whose input is connected across the power supply, when closed, and assuming switch 366 to be closed, serves to apply the voltage of the power supply to the input winding 368 of a transformer 369. The voltage of the secondary winding 370 of this transformer is applied to the actuating winding 371 of switch contacts 364 by way of the normally open contacts 372 and 373 of a relay generally designated 374.

Voltage from secondary 370 is also applied by way of manually operable switch 375 across the input terminals of a variac 376 whose adjustable output from leads 377 and 378 is applied to the full wave rectifier generally designated 379. The output of the rectifier, thus controlled variably by adjustment of the variac, is applied to the leads 380 and 381 to the direct current input of the saturable reactor 363 to thus variably control its output in accordance with the D.C. input in a well known manner.

A thermocouple 381 which is located within the vicinity of the brazing platen and preferably directly on the work to be brazed thereon provides an input to a strip chart program controller generally designated 382 which may be of any suitable well known type such, for example, as Minneapolis Honeywell Y153R10. Chart control 382 is operated from the voltage of secondary winding 370 to which it is connected by way of the manually operable switch 383. Chart control 382 includes suitable switch means which may be normally closed and set to open when the temperature within the vicinity of thermocouple 381 reaches a predetermined value such, for example, as that required for discontinuation of the energization of heating element 325. Such predetermined temperature may be at or near the peak temperature required in the brazing cycle. This chart control switch is connected in series with the winding 384 of relay 374 and a manually operable switch 385 across secondary winding 370, the arrangement being such that upon initially closing switch 385, winding 384 is energized from transformer 369. When this occurs, switch contacts 372 and 373 are closed to energize winding 371 from transformer 369 and, this in turn, closes contacts 364 to apply power to transformer 361 by way of the saturable reactor 363, the amount of power so supplied, being controlled by the energization of the D.C. input to the saturable reactor, as aforedescribed. When the brazing temperature is reached, the switch control means in chart control 382 opens to break the circuit energizing relay 374 whereupon winding 371 is deenergized, contacts 364 open and further energization of transformer 361 by way of the saturable reactor 363 is discontinued to thus terminate the brazing cycle.

It will be understood that chart control 382 has provision for supplying, as by of leads 386 and 387, a variable D.C. output in relation to the temperature sensed by thermocouple 381 such that when this D.C. output is applied, as in FIG. 20, by way of magnetic amplifier 388 to saturable reactor 363, the energization of platen 325 may be so controlled that the temperature of the same rises in accordance with a predetermined program established at chart control 382.

In the arrangement of FIG. 20, chart control 382 is used as the master controller and its associated sensing thermocouple 381 is mounted in sensing relation to a heater element 325 which serves as the master platen. The master platen, for example, may be that heater element 325 disclosed at the extreme left in FIG. 16 and disposed beneath the thick end portion of the wedge shaped panel assembly 350 which is exemplary of the various panel configurations which may be brazed in the use of the apparatus of FIGS. 16 to 20. The thickened end portion of the wedge shaped panel is presumed to be the slowest zone in which the heating of the panel occurs, that is, this is presumed to be the zone in which the temperature rises at the slowest rate.

Master controller 382 may have a motor driven index and associated programming switches with provision for the index to move up-scale at a rate determined by an interrupter when the program cycle is initiated by the operator with the controller initially at ambient temperature. In this arrangement, the temperature of the master zone wherein the work is positioned in heat transfer relation to the master platen will follow that of the up-scale movement of the index. Alternatively, master controller 382 may be set to supply full heat to the master platen until the energization of the platen is cut off as aforedescribed in connection with FIG. 19. In this arrangement, the rate of temperature rise of the master platen and its associated work structure is not adjustable, but depends entirely upon the speed of the temperature rise in the master zone which is the slowest zone.

Other heating elements 325 in heat transfer relation to other portions of the wedge panel, as best seen in FIG. 16, serve as slave platens and are energized under control of slave controllers 389 which may be of any type suitable for the purpose such, for example, as Minneapolis Honeywell Y156R16. It will be understood that whereas in FIG. 20 only two such slave controllers are disclosed for controlling the energization of two slave platens or heating elements 325, as many such additional platens and associated control systems may be employed as are required for a particular panel structure and as are available in the apparatus of FIGS. 16 to 18.

Slave controllers 389 operate generally in their respective control systems in the same manner as master controller 382, the rate of heat rise in the slave platens 325, however, being controlled by the difference in temperature between each of the slave platens and that of the master platen. To this end, each input circuit to a slave controller 389 comprises a thermocouple 390 located in the master zone and a second thermocouple 391 located in the slave zone and connected in series opposition therewith, as indicated by the associated polarity signs, within the input circuit to the slave controller which supplies energization to the platen individual to thermocouple 391. Similarly, a second, and additional slave systems, have similarly connected thermocouples in their respective input circuits as indicated, for example, by the second slave system disclosed in FIG. 20 in which the associated thermocouples are designated 390' and 391'.

In the operation of the circuit arrangement of FIG. 20, and regardless of whether full or programmed heat is supplied to the master platen zone, the temperature of the master zone will rise until it reaches a temperature at or near that required for brazing and energization of the master platen will then be terminated. The rise in temperature of the slave platen zones will follow that of the master zone and, similarly, upon reaching the brazing temperature, their respective controllers 389 will terminate the energization of the platens individual thereto.

Referring now to FIGS. 21 to 30, it will be seen that brazing apparatus constructed in accordance with the preferred embodiment of the present invention employs one or more sheets of graphite cloth as the heating element of the graphite means, which graphite means otherwise is employed generally in the same manner as in the other embodiments to provide the heater-reference functions of the brazing apparatus. The graphite cloth heater elements, unlike the slab graphite heaters, being of a cloth or fabric nature are inherently flexible, resilient, and yieldable and therefore well adapted to absorb thermal and other shocks incident to the brazing operation. The graphite cloth is also well adapted to conform to various shapes, configurations, and contours which may be desired in the panel assemblies and which necessarily must be fixed in the graphite reference slabs. The graphite cloth, moreover, is readily adapted to the attachment thereto of terminal connections, as will more fully appear as the description proceeds.

The graphite cloth, furthermore, provides substantially instantaneous response to energization, much in the same manner as a carbon lamp, with the result that the time of the brazing cycle may be greatly reduced to a period of a few minutes as is disclosed graphically in the chart of FIG. 31. From this chart, which typically discloses the temperature reading taken in an actual brazing cycle, it may be seen that a peak brazing temperature of 1700° F. was reached in four minutes and, upon cooling, the temperature was reduced to 500° F. in approximately eleven minutes after the start of energization, the panel assembly at this time being removed from the brazing box. Similarly, in a series of tests, panels of the conventional 17–7 pH stainless steel skins and core, have been brazed on cycles as short as nine minutes. The average test run brazing cycle, however, conducted for the most part on panels of production size, has been of the order of thirty minutes. Notwithstanding the shortness of the brazing cycle, however, subsequently performed destruction and X-ray tests invariably show uniformly high quality of the brazing, and the high quality persists notwithstanding variations in the panel thicknesses which, in the present state of development of the brazing process of the present invention, may range up to the order of 3¾".

Among other factors, the high quality of the braze is attributable to the speed with which the locally heated panel assembly per se is brought up to brazing temperature and to the ability to limit and control further temperature rise following deenergization of the heater elements. This is manifested in the chart of FIG. 31 wherein it may be seen that the peak temperature of 1700° F. is maintained for approximately fifteen seconds before the cooling cycle is begun. This is a significant feature in that it is essential to have adequate free flow of the melted brazing alloy to form fillets between the inner surfaces of the skins and the confronting edges of the honeycomb core. Excessive and/or prolonged brazing temperatures, however, invariably result in more or less uncontrolled flow of the melted brazing alloy and this, in the areas in which it occurs, causes weakening or complete absence of fillets with resultant loss of structural integrity of the panel, and the accompanying spread of the heat conducting alloy material in such areas and along the length of the thickness dimension of the panel further impairs its effectiveness, in ultimate use, as a heat barrier.

In addition to the foregoing and other advantages, graphite cloth maintains its structural integrity notwithstanding repeated energization and use and may be heated to temperatures considerably above the upper threshhold of known metallic conductors. Physically, it has the appearance of blackened burlap and, being a loose open fabric material, is virtually transparent to the transfer of heat therethrough. Being graphite, it also has inherent lubricant qualities by which it lends itself well for use as a slip-sheet which, as commonly employed in conventional brazing practices, is in the form of a copper or stainless steel sheet placed next to the skins to facilitate sliding movement of the skins as the same expand and contract with changes in temperature during the brazing cycle. In summary, the graphite cloth is a good conductor both of electrical current and heat while also having electric resistance comparable to that of the most common resistance metals such as nickel and Nichrome, but being more heat-resistant than such metals. It is highly flexible and pliable and remarkably durable even at above-brazing temperatures and repeated energization.

Graphite cloth of any type suitable for the purpose may be employed in the brazing apparatus of the present invention, however, graphite cloth developed by the National Carbon Company has been found to be satisfactory in use and is preferred. This material is produced from yarns, braids, and felts, or fabrics that are woven or knit and, the cloth of fabric such, for example, as rayon, is graphitized by electrically heating it to a temperature approaching 5400° F. In this thermal-chemical conversion, the crystalline structure of the material is changed to that of graphite, similar to that used for electric furnace electrodes, nuclear reactor structures, metallurgical molds, and like industrial applications.

Referring now first more particularly to the schematic views of FIGS. 21 to 24, it will be seen that the panel assembly, in each case, is sandwiched in between upper and lower graphite cloth conductors 425. In FIGS. 21 and 22 the panel assembly 250 is flat, that is, the faces of the core and therefore the opposing surfaces of the skins are parallel. Accordingly, the graphite reference slabs 412 of which there is an upper and a lower for use cooperatively with the upper and lower graphite cloth heating elements are of simple rectangular configuration. Similarly, in the case of the apparatus of FIG. 23, the graphite reference slabs 412 are also of the simple rectangular configuration even as used in the brazing of wedge shaped panel 350 disclosed therein. This follows from the fact that the upper reference slab 412 is merely tilted to conform with the inclined surface of the wedge panel 350, and the pressure pad 248 likewise conforms to the inclination thus imparted to the upper reference slab 412. In FIG. 24, the apparatus is shaped and flexed, as the case may be, to a panel assembly 450 which is concavo-convex. In this case, the lower graphite reference 512 is machined or molded to present an upper concave surface 513 which substantially matches the lower convex surface 452 of panel 450, and the upper reference slab is provided with a lower convex surface 613 which substantially matches the upper surface 453 of panel 450.

Graphite slabs 412 and 512 are supported above the bottom of the lower brazing box portion 201 as by a block of stainless steel honeycomb core 455 which is provided in its under surface with a plurality of transversely extending grooves for receiving transverse tubes 448 which connect at their ends into the perimetrical header 447 employed to introduce the argon into the brazing box, as aforedescribed. Similarly, a honeycomb spacer 460, as required, may be interposed between the pressure applying weights 461 and the upper reference slab 412 of FIG. 21 or, as in FIG. 22, between the pressure pad 248 and the upper reference slab 412. In like manner, in FIGS. 23 and 24, such an upper honeycomb spacer 460 may be interposed at 462 to fill the space, as required, between the pressure pad 248 and the upper graphite reference slab 412. FIGS. 21 and 22 which generally disclose the same structure and arrangement of parts, differ from each other only in that weights 461 are utilized in FIG. 21 to apply the necessary pressure for holding the panel 250 in assembled relationship between the upper and lower reference slabs 412 rather than the pressure pad 248 which accomplishes this function in the arrangement of FIG. 22.

One or more fabric or cloth sheets 255 of suitable heat-resistant dielectric and cushion material such as Fiberfrax and Refrasil are supported above lower reference slabs 412 and 512 and disposed beneath the lower graphite cloth conductor 425. As may be noted in FIG. 24, both the dielectric cloth material and the graphite cloth conductor conform readily to the concave surface 513 of the lower graphite reference slab 512. As noted in FIGS. 21 and 22, one or more thermocouples 381 are interposed between a pair of the sheets of dielectric cloth material 255, these being similarly inserted as at 471 in FIGS. 23 and 24. One or more layers of quartz cloth dielectric insulation and cushion material such, for example, as Refrasil are interposed between the panel assembly, in each case, and the upper and lower graphite cloth conductors 425. One or more layers of dielectric insulation and cushion material 255 are placed on the upper surface of the upper graphite cloth heater element 425, and thermocouples 381 are located as required between adjacent sheets of this material as disclosed in FIGS. 21 and 22 and as indicated at 473 in FIGS. 23 and 24. One or more layers of a suitable dielectric heat-resistant and cushion material such, for example, as Fiberfrax are disposed above and below the upper graphite elements 412 and 612 and, in addition, one or more layers of this sheet material are interposed between weights 461 and the honeycomb spacer 460 in FIG. 21.

In the schematic showings of FIGS. 21 to 24, the parts employed in the brazing process are disclosed in the manner of exploded views to illustrate the arrangement and lay-up of parts preparatory to sealing the box, purging the same, and finally energizing the graphite heater cloth conductors to initiate the brazing cycle and effect the braze of the panel assembly. The argon is admitted into the brazing box by way of tube 447 and dispersed therefrom and from the auxiliary tubes 448 upwardly through the cells of the honeycomb core spacer 455 and generally upward of and throughout the free space within the brazing box, the argon passing out of the box as at the outlet 475 and to suitable pressure gauges and argon purity checking instruments (not shown) by way of outlet 476. A suitable gas under pressure is supplied to the pressure pad or bellows 248 by way of the conduits indicated at 244, as before.

In practice, in the use of the apparatus of FIG. 21 the successive layers of parts including the panel assembly are inserted into the lower box portion 201 in the order depicted from bottom to top with the weights 461 being the last to be applied to the pile-up of the successive layers. The upper brazing box portion or lid 200 is then applied and the two box portions hermetically sealed. The box is then purged, as before, after which the graphite cloth heater elements 425 are energized to effect the braze. The procedure in the use of the apparatus of FIGS. 22 to 24 is generally similar, with the exception that the pressure pad 248 is applied to the assembly of the other parts within the lower box portion 201 along with the application of the upper lid portion 200.

Reference is now made to FIGS. 25 to 30 for details of construction of the apparatus disclosed schematically in FIG. 22, it being noted, for example, FIGS. 25 and 26, that each of the graphite cloth conductors 425, at each end thereof, is wrapped one or more times about a central conductor terminal plate 480 which is clamped between similar metallic outer terminal plates 481 by suitable fastening means indicated at 482. A suitable terminal lead 483 having a connector 484 at each end serves to connect the terminal plate assemblies 480, 481 to identical terminal posts generally designated 426. It will be understood that the opposite adjacent ends of the graphite heater elements are similarly connected to similar posts when parallel operation of the heater elements is desired or, these ends are connected together electrically for series operation between the two posts 426 disclosed in FIGS. 25 to 27.

The assembly of terminal plates 480, 481 for the upper graphite heater element are supported on a block 485 formed of any insulation material suitable for the purpose. This block conveniently is supported on lower graphite reference element 412 and has an opening 486 through which lead 483 from the lower graphite element 425 is passed to make connection with terminal post 426.

Terminal posts 426 are shown in greater detail in FIG. 28 from which it may be seen that each post comprises a central metallic member 487 which is drilled and tapped at each end as at 488 for suitable attachment of lead connectors 484 and external circuit connections. A pair of flanged complementary adapters 490 formed of any insulation material suitable for the purpose are clamped to opposite ends of member 487 as by suitable ring clamps 491, the open ends of which may be bolted together as at 492 to effect the desired clamping action. Each adapter 490 has an end hub 493 which engages that of the other within an opening 494 provided therefor within lower box portion 201, the parts being urged into such relationship to seal this box opening by provision of the fasteners 495 which urge the flanges together and against opposite surfaces of the wall of the brazing box.

It will be noted that the upper and lower surfaces respectively of the lower and upper honeycomb spacer blocks 455 and 460 preferably are provided with one or more transversely extended recesses 495 and 496 respectively which provide passage for dispersion of the purging gas and also for the passage of leads 497 to the thermocouples 381, as disclosed in FIG. 29. Lower and upper graphite reference slabs 412 are also apertured as at 498 and 499 respectively to accommodate the thermocouple leads 497.

The details of the argon dispensing tubes 447 and 448 are best seen in FIG. 30 which discloses the manner in which the transverse tubes 448 open into the perimetrical tube 447 and further discloses the plurality of gas dispensing openings 501 and 502 provided respectively in tubes 447 and 448.

Upper lid portion 200 is provided with suitable eyelets 503 to facilitate manipulation of the upper box portion relative to the lower box portion 201, and hand operated clamps 504, or the like, are provided to clamp the box rim portions 203 and 204 together to hermetically seal the brazing box.

As best seen in FIG. 25, one or more windows formed of Pyrex glass, or the like, are employed in the lower box portion 201 in order that the brazing operation may be viewed, particularly the glow of the graphite cloth conductors may be observed to thus provide a visual check on the proper energization and heating of the graphite cloth heater elements.

In the pre-brazing preparation of a panel assembly, the parts thereof are scrupulously cleaned and assembled in an air conditioned room with the observance of precautions such as may be extant in a hospital operating room. Upon completion of lay-up of the panel assembly, the same is protected in a sealed plastic bag filled with a suitable inert gas such as argon. The brazing chamber is cleaned and also filled with argon gas prior to locating the panel in the chamber; elimination of all possible contamination in the brazing platen and associated apparatus being essential to avoid introduction of foreign materials and contaminants that could contribute to combustion and thus result in a defective panel. The sealed panel assembly is then placed in position in the argon-filled chamber and, after cutting away the plastic cover, the various components and layer materials are applied as depicted in FIGS. 21 to 24. Electrodes and thermocouples are then placed in position and tested; the box then being sealed. The brazing chamber is then purged with argon, being evacuated and flushed as necessary to achieve the desired brazing atmosphere which may be indicated and measured by available purity check instrumentation. The power is then turned on and the brazing cycle initiated.

This invention may be embodied in other forms or carried out in other ways without departing from the spirit or essential characteristics thereof. The present embodiments of the invention are therefore to be considered in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. Apparatus for brazing the ends of a metallic cellular core to the opposing faces of two spaced apart metallic skins to produce a honeycomb sandwich panel comprising, a hermetically sealed brazing box for containing an inert gaseous atmosphere of low thermal conductivity, graphite means mounted within said box in spaced relation from the top, bottom and sidewalls thereof for electrically generating the brazing heat and for reference support of the panel in assembled relationship for brazing, yieldable dielectric, heat-resistant, and heat conducting means interposed between the graphite means and said panel assembly for conducting the brazing heat uniformly thereto, for electrically insulating the panel assembly from said graphite means and for cushioning the panel assembly in supported relation on said graphite means, and pressure means for urging the panel assembly against said graphite means in assembled and supported relationship thereon, said graphite means and said panel assembly thereon being centrally located within said box and forming therewith substantial chambers within the box for containing said atmosphere whereby said graphite means and panel assembly are substantially enclosed by said atmosphere, the brazing heat is localized at the panel assembly, a high temperature gradient is maintained between the panel assembly and the surfaces of the box, and the external surfaces of the box are maintained at or near room temperature during generation of the brazing heat.

2. Apparatus for brazing the ends of a metallic cellular core to the opposing faces of two spaced apart metallic skins to produce a honeycomb sandwich panel comprising, a hermetically sealed brazing box for containing an inert gaseous atmosphere of low thermal conductivity, heater-reference graphite means mounted within said box in spaced relation to the top, bottom and sidewalls thereof, at least one sheet of dielectric heat-resistant cloth material disposed on the upper surface of said heater-reference graphite means for supporting said sandwich panel in assembled relationship thereon, and pressure means disposed on the upper side of said assembled panel for urging the same in assembled and supported relationship on said heater-reference graphite means, said graphite means and said panel assembly thereon being centrally located within said box and forming therewith substantial chambers within the box for containing said atmosphere whereby said graphite means and panel assembly are substantially enclosed by said atmosphere, the brazing heat is localized at the panel assembly, a high temperature gradient is maintained between the panel assembly and the surfaces of the box, and the external surfaces of the box are maintained at or near room temperature during generation of the brazing heat.

3. Apparatus for brazing the ends of a metallic cellular core to the opposing faces of two spaced apart metallic skins to produce a honeycomb sandwich panel comprising, a hermetically sealed brazing box for containing an inert gaseous atmosphere, graphite reference means disposed within said box and mounted in spaced relationship with respect to the bottom and sidewalls thereof, graphite heater means supported on said graphite reference means and electrically insulated therefrom, at least one layer of dielectric, heat-resistant fabric material disposed on said graphite heater means for supporting the sandwich panel in assembled relationship for brazing on said graphite heater and reference means, and pressure means for urging said sandwich panel in assembled and supported relationship on said graphite heater and reference means.

4. Apparatus for brazing the ends of a metallic cellular core to the opposing faces of two spaced apart metallic skins to produce a honeycomb sandwich panel comprising, a separable two piece brazing box including means for hermetically sealing the same in assembled relationship and having means for receiving and containing therewithin an inert gaseous atmosphere, graphite reference means disposed within said box and mounted in spaced relationship with respect to the bottom and sidewalls thereof, a relatively thinner graphite heating means supported on said graphite reference means, yieldable dielectric means interposed between said graphite reference and heating means for electrically insulating and cushioning the same with respect to each other, yieldable dielectric heat resistant means supported on said graphite heater means for supporting said sandwich panel in assembled relationship on said graphite heater and reference means, and means disposed on the opposite side of said sandwich panel for urging the same in assembled and supported relationship on said graphite heater and reference means.

5. The furnaceless method of brazing a metallic honeycomb sandwich panel assembly of unsymmetrical configuration comprising the steps of locally generating heat electrically and discretely in heat conducting and heat transferring relation with respect to asymmetrical portions of said panel assembly, sensing the temperature in the heating zone of one of said panel portions and controlling the rate of temperature rise therein in accordance with the temperature so sensed, separately sensing the difference in temperature between said heating zone and those heating zones individual to each of the other portions of said panel, and controlling the rate of temperature rise in each of the other of said heating zones selectively in accordance with said temperature differences.

6. The furnaceless method of brazing a metallic honeycomb sandwich panel assembly comprising the steps of locally generating heat electrically and discretely in proximity to different surface areas of said panel assembly, transferring said generated heat by conduction to said panel assembly uniformly over and within said surface areas, sensing the temperature in the heating zone of one of said surface areas and controlling the rate of temperature rise therein in accordance with the temperature so sensed, separately sensing the difference in temperature between said heating zone and those heating zones individual to each of the other surface areas of said panel, and controlling the rate of temperature rise in each of the other of said heating zones selectively in accordance with said temperature differences.

7. Furnaceless brazing apparatus for brazing metallic honeycomb sandwich panel assemblies comprising flexible graphite heating means for sandwiching said panel assembly therebetween, and at least one sheet of flexible heat-resistant dielectric sheet material interposed yieldably between said panel and each of said heating elements.

8. Furnaceless brazing apparatus for brazing metallic honeycomb sandwich panel assemblies comprising a temperature stable platform for supporting a panel assembly to be brazed, a graphite heating element in the form of a sheet of graphite cloth disposed on said platform and insulated electrically therefrom, at least one sheet of heat-resistant, heat conductive dielectric cloth material interposed yieldably between said panel assembly and said graphite cloth, and means for urging said panel assembly in assembled relation against said platform.

9. Apparatus for brazing the ends of a metallic cellular core to the opposing faces of two spaced apart metallic skins to produce a honeycomb sandwich panel comprising, a hermetically sealed brazing box for containing an inert gaseous atmosphere, graphite reference and heater means disposed within said box and supported substantially centrally therewithin in spaced relationship with respect to the bottom and sidewalls of the box, said graphite means including at least one conductor sheet of graphite cloth disposed in heat transfer relation to an extended surface of a panel to be brazed and disposed in assembled and supported relationship on said graphite reference means, at least one layer of dielectric heat-resistant, heat conductive cloth material interposed yieldably between said graphite cloth and said surface of the panel assembly, and pressure means for urging said sandwich panel in assembled and supported relationship on said graphite reference means.

10. Apparatus for brazing a metallic honeycomb sandwich panel assembly comprising a hermetically sealed brazing box for containing an inert gaseous atmosphere, a first graphite reference element, a first honeycomb spacer member for supporting said reference element in spaced relation above the floor of said box, at least one layer of heat-resistant, heat conductive dielectric cloth disposed on said reference element, at least one conductor sheet of graphite cloth supported on said layer of dielectric cloth, at least one layer of dielectric heat resistant, heat conductive cloth disposed on said graphite cloth and having a panel to be brazed supported thereon, at least one layer of dielectric heat-resistant, heat conductive cloth supported on the top-side of said panel assembly, at least one conductor sheet of graphite cloth supported on said last named sheet of dielectric cloth material, a second graphite reference element supported on said last named cloth material, a second honeycomb spacer member mounted on said second graphite reference element, and pressure means interposed between said second spacer member and the upper wall of said box for urging said panel assembly in assembled relationship between said first and second reference elements.

11. Apparatus for brazing the ends of an unsymmetrical metallic cellular core to the opposing faces of two spaced apart metallic skins to produce a honeycomb sandwich panel, comprising, a separable two-piece brazing box including means for hermetically sealing the same in assembled relationship and having means for receiving and containing therewithin an inert gaseous atmosphere, graphite reference and heating means disposed within said box and mounted in spaced relationship with respect to the bottom and sidewalls thereof, said graphite means comprising a plurality of mutually spaced and electrically insulated heating elements disposed respectively in heat conducting and transfer relationship with respect to asymmetrical portions of said panel to be brazed, means for individually heating said elements variably in accordance with the rate of temperature rise in the heating zone of one of said elements, said heating means comprising means for sensing the temperature in the heating zone of one of said elements serving as a master platen, means for controlling the heating of said master platen in accordance with the temperature sensed by said sensing means individual thereto, means individual to said master platen and each of the other of said heating elements serving as slave platens for sensing the difference in temperature between the master platen and each of said slave platens, and means individual to said slave platens for controlling the heating of the same in accordance with the temperature difference sensed by the sensing means respectively individual thereto.

References Cited in the file of this patent

UNITED STATES PATENTS

| | | |
|---|---|---|
| 2,363,719 | Cooper | Nov. 28, 1944 |
| 2,395,849 | Collom | Mar. 5, 1946 |
| 2,693,636 | Simpelaar | Nov. 9, 1954 |
| 2,984,732 | Herbert | May 16, 1961 |